(12) United States Patent
Kim et al.

(10) Patent No.: US 10,302,335 B2
(45) Date of Patent: May 28, 2019

(54) HEAT RECOVERY APPARATUS

(71) Applicant: LG CHEM, LTD., Seoul (KR)

(72) Inventors: Tae Woo Kim, Daejeon (KR); Sung Kyu Lee, Daejeon (KR); Joon Ho Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 259 days.

(21) Appl. No.: 15/315,681

(22) PCT Filed: Jun. 10, 2015

(86) PCT No.: PCT/KR2015/005816
§ 371 (c)(1),
(2) Date: Dec. 1, 2016

(87) PCT Pub. No.: WO2015/190823
PCT Pub. Date: Dec. 17, 2015

(65) Prior Publication Data
US 2017/0191704 A1    Jul. 6, 2017

(30) Foreign Application Priority Data

Jun. 10, 2014 (KR) .................. 10-2014-0070221
Jun. 10, 2015 (KR) .................. 10-2015-0081736

(51) Int. Cl.
*F25B 6/02* (2006.01)
*F01K 11/02* (2006.01)
(Continued)

(52) U.S. Cl.
CPC ............ *F25B 6/02* (2013.01); *F01K 7/16* (2013.01); *F01K 11/02* (2013.01); *F01K 13/02* (2013.01);
(Continued)

(58) Field of Classification Search
CPC .. F25B 6/02; F25B 11/02; F25B 11/04; F25B 2500/19; F25B 2339/047; F25B 25/00;
(Continued)

(56) References Cited

U.S. PATENT DOCUMENTS 4,712,610 A * 12/1987 Kesten ................. F01K 25/00
                                                        165/104.12
4,760,705 A *  8/1988 Yogev ................... C09K 5/04
                                                            60/641.8

(Continued)

FOREIGN PATENT DOCUMENTS

EP         2640682 B1    7/2018
JP        58115268 A     7/1983
(Continued)

OTHER PUBLICATIONS

F. P. Incropera, D. P. DeWitt, T. L. Bergman & A. S. Lavine, 2006, Fundamentals of Heat and Mass Transfer, 6th edition, pp. 686-688. John Wiley & Sons US (Year: 2006).*

*Primary Examiner* — Cassey D Bauer
*Assistant Examiner* — Miguel A Diaz
(74) *Attorney, Agent, or Firm* — Dentons US LLP

(57) ABSTRACT

The present application relates to a heat recovery apparatus and method. According to the heat recovery apparatus and method, low-level heat sources at a temperature less than 100° C. discharged from industrial settings or various chemical processes, for example, a petrochemicals manufacturing process are not wasted but used to generate steam and the generated steam is used for various processes to reduce an amount of consumed high-temperature steam that is an external heat source to be used for a reactor or distillation column, thereby not only maximizing energy reduction efficiency but also autonomously producing power consumed by a compressor. Also, an evaporation phenom- (Continued)

enon of a part of a refrigerant flow which passes through the compressor may be reduced, thereby recovering heat with excellent efficiency.

6 Claims, 7 Drawing Sheets

(51) Int. Cl.
  *F25B 11/04* (2006.01)
  *F02C 6/18* (2006.01)
  *F01K 7/16* (2006.01)
  *F01K 13/02* (2006.01)
  *F01K 25/08* (2006.01)

(52) U.S. Cl.
  CPC ............... *F01K 25/08* (2013.01); *F02C 6/18* (2013.01); *F25B 11/04* (2013.01); *F24H 2240/127* (2013.01); *F25B 2339/047* (2013.01); *F25B 2500/19* (2013.01); *F25J 2240/70* (2013.01); *F25J 2240/82* (2013.01); *Y02P 20/123* (2015.11); *Y02P 20/124* (2015.11); *Y02P 80/154* (2015.11); *Y02P 80/156* (2015.11)

(58) Field of Classification Search
  CPC .......... F25B 25/005; F01K 3/205; F01K 7/16; F01K 13/02; F01K 11/02; F01K 25/08; F25J 2240/70; F25J 2240/82; F24H 2240/127; F02C 6/18; Y02P 20/123; Y02P 20/124; Y02P 80/156
  See application file for complete search history.

(56) References Cited

U.S. PATENT DOCUMENTS

| | | | | |
|---|---|---|---|---|
| 5,860,279 A * | 1/1999 | Bronicki | ................. | F01K 23/04 165/85 |
| 7,658,072 B2 | 2/2010 | Masada | | |
| 8,726,677 B2 * | 5/2014 | Berson | ................. | F24F 5/0046 62/116 |
| 9,816,402 B2 * | 11/2017 | Kauffman | ............... | F01K 9/003 |
| 2002/0050134 A1 * | 5/2002 | Bronicki | ............... | F01K 21/047 60/39.182 |
| 2004/0255593 A1 * | 12/2004 | Brasz | ........................ | F02C 6/18 60/772 |
| 2006/0225440 A1 * | 10/2006 | Chang | ..................... | F25B 9/004 62/86 |
| 2011/0296849 A1 * | 12/2011 | Benson | .................. | F01K 25/10 62/6 |
| 2014/0341710 A1 * | 11/2014 | Creamer | ............... | F04D 29/063 415/111 |
| 2017/0002695 A1 * | 1/2017 | Kim | ........................ | F01K 25/04 |
| 2018/0031287 A1 * | 2/2018 | Nagae | ....................... | F25B 5/02 |
| 2018/0135899 A1 * | 5/2018 | Turner | ..................... | F25B 6/02 |
| 2018/0135914 A1 * | 5/2018 | Kim | ........................ | F28C 3/04 |
| 2018/0187572 A1 * | 7/2018 | Apte | ........................ | F01K 3/12 |
| 2018/0187597 A1 * | 7/2018 | Apte | ....................... | F01K 23/10 |

FOREIGN PATENT DOCUMENTS

| | | | | |
|---|---|---|---|---|
| JP | S58115268 A | * | 7/1983 | ................. F25B 9/00 |
| JP | 2006-118754 A | | 5/2006 | |
| JP | 2012511087 A | | 5/2012 | |
| KR | 10-2007-0116106 A | | 12/2007 | |
| KR | 10-1092691 B1 | | 12/2011 | |
| KR | 10-1295806 B1 | | 8/2013 | |

* cited by examiner

[FIG. 1]
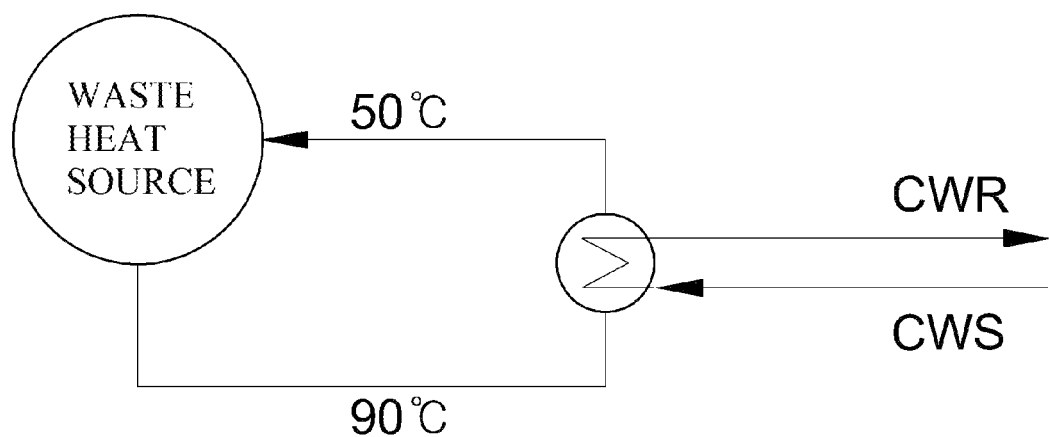

[FIG. 2]
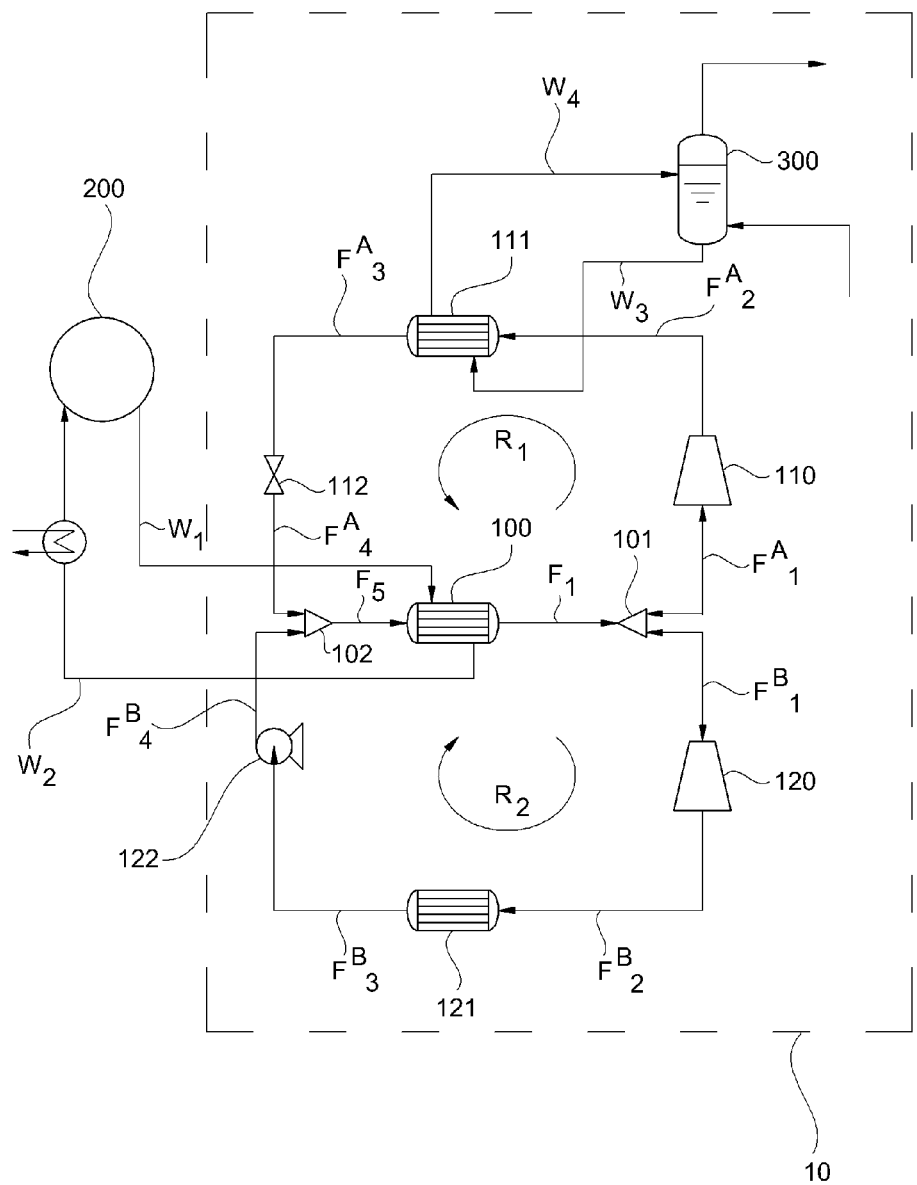

[FIG. 3]
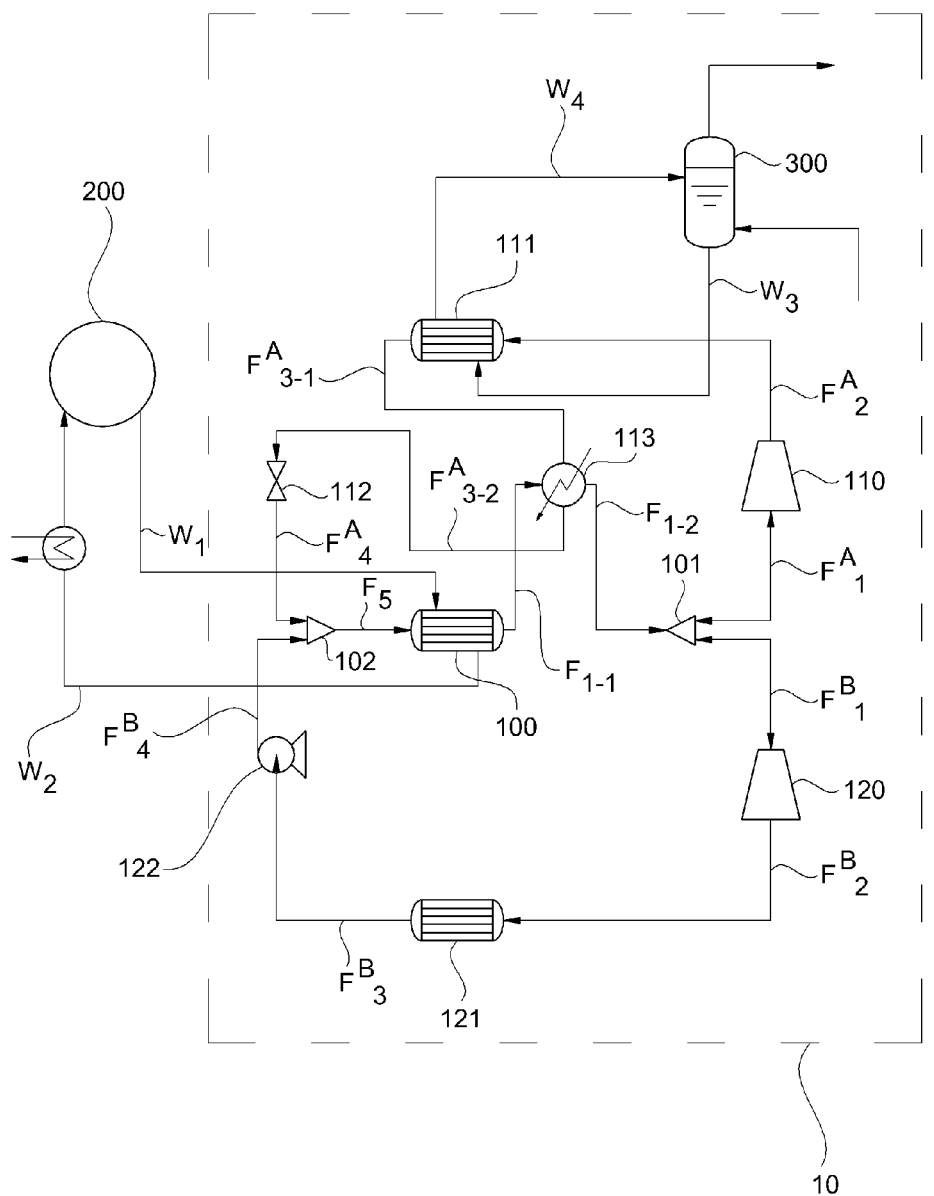

[FIG. 4]
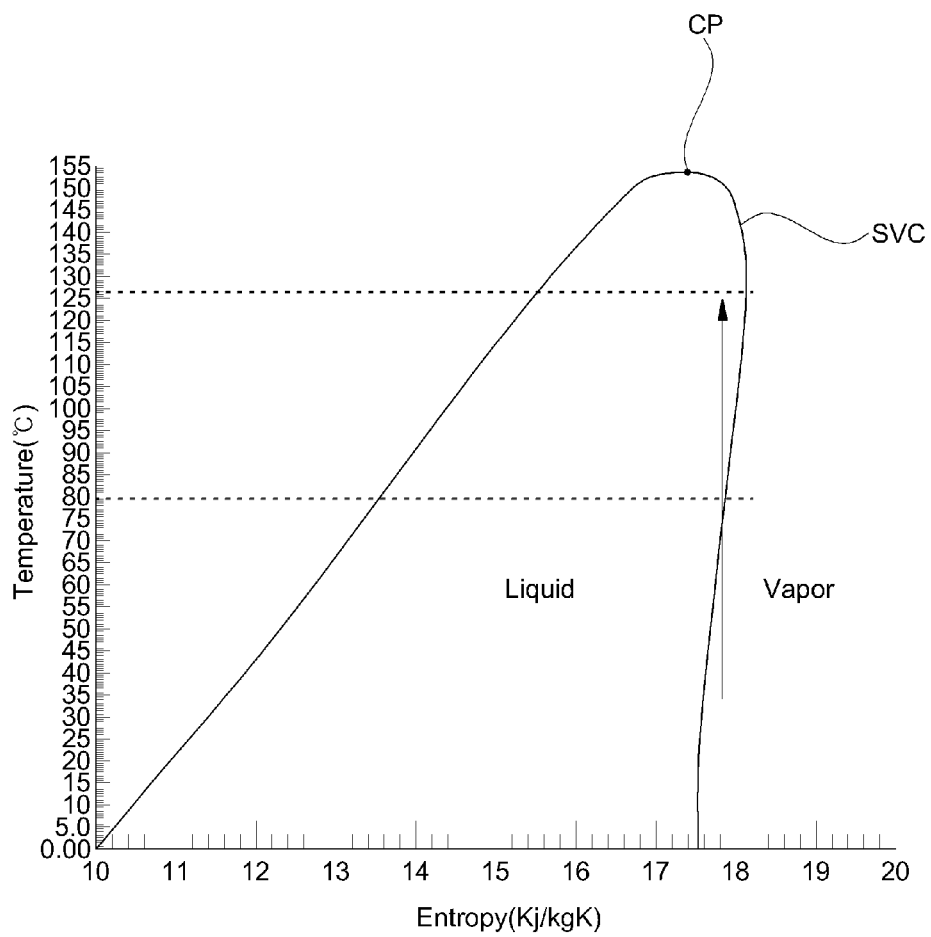

[FIG. 5]
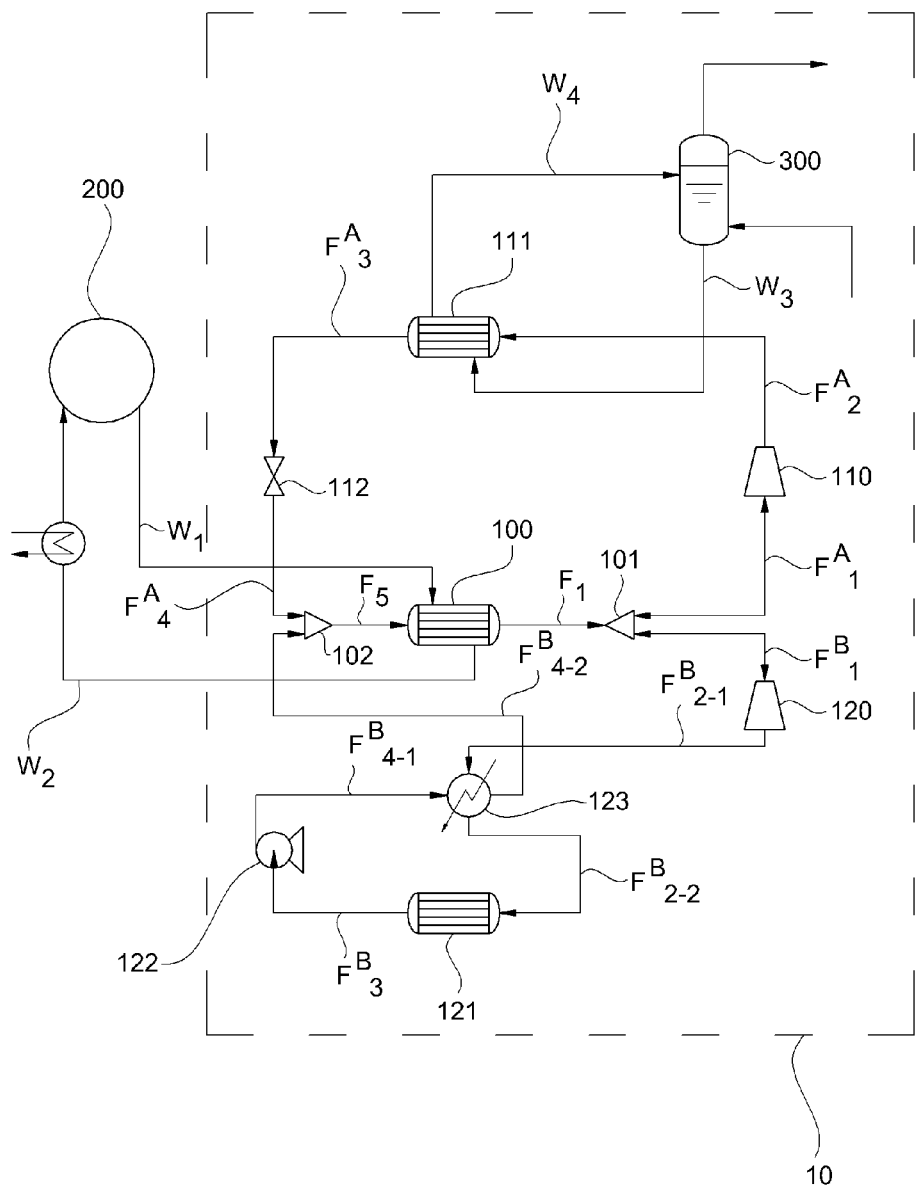

[FIG. 6]
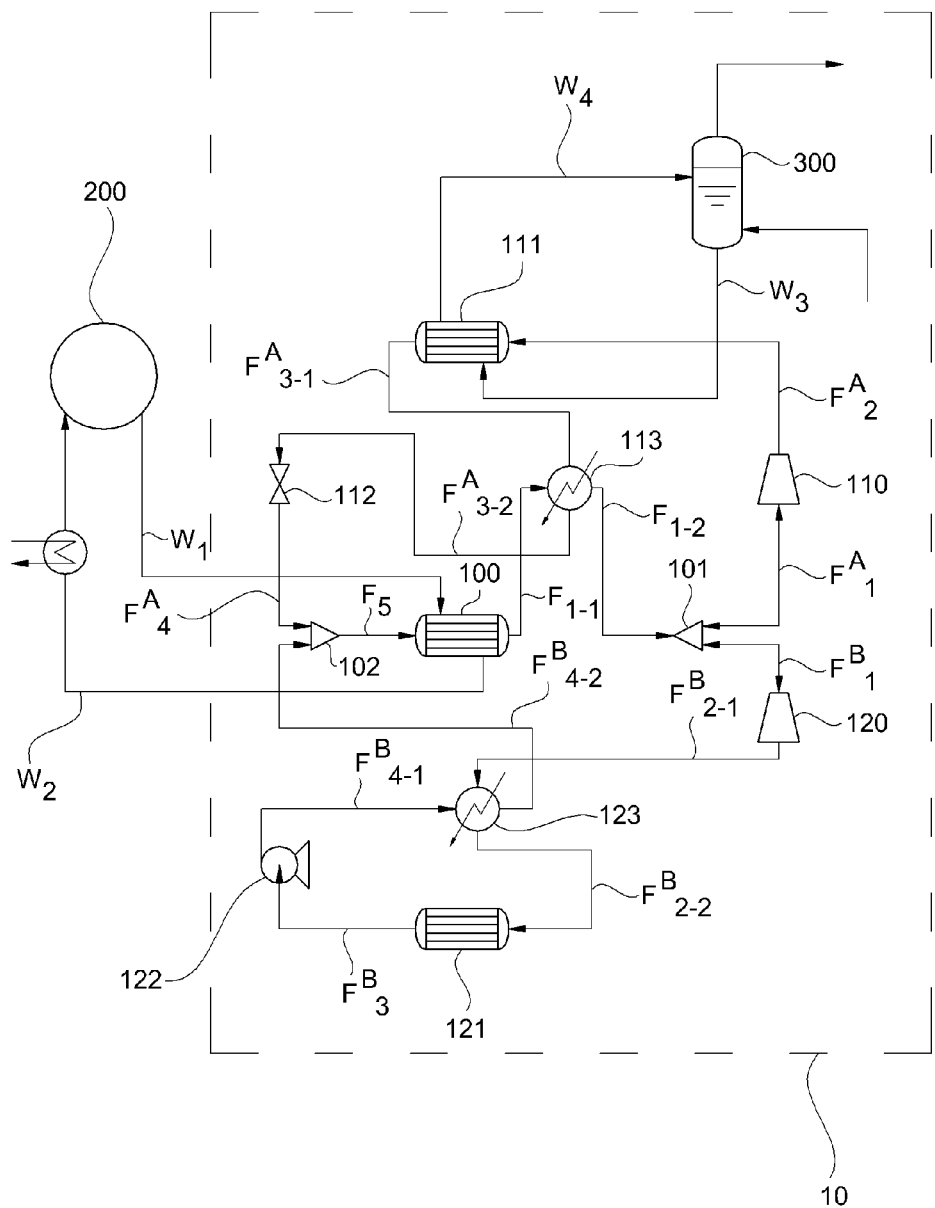

[FIG. 7]
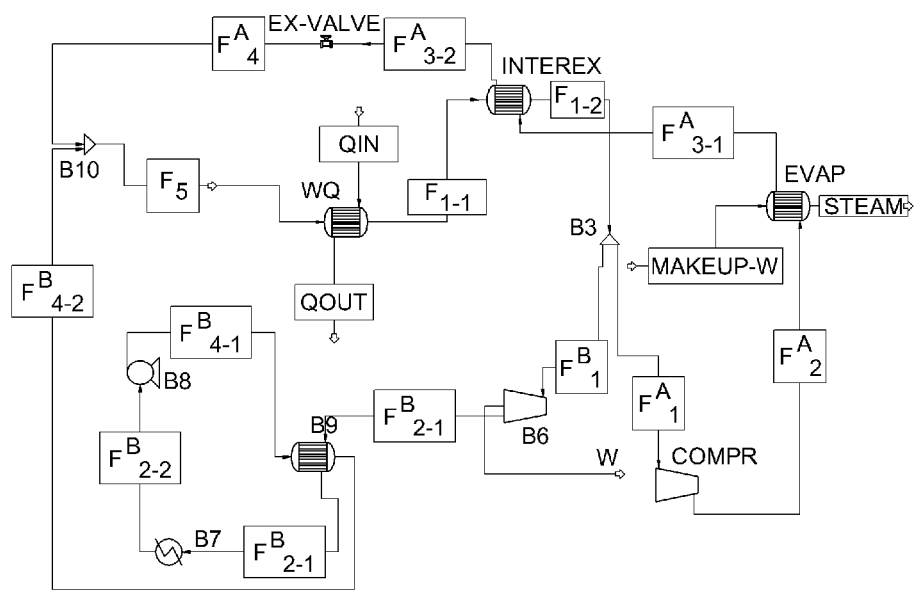

HEAT RECOVERY APPARATUS

This application is a National Stage Application of International Application No. PCT/KR2015/005816 filed on Jun. 10, 2015, which claims the benefit of Korean Patent Application No. 10-2014-0070221 filed on Jun. 10, 2014 and Korean Patent Application No. 10-2015-0081736 filed on Jun. 10, 2015, all of which are hereby incorporated by reference in their entirety for all purposes as if fully set forth herein.

TECHNICAL FIELD

The present application relates to a heat recovery apparatus and method.

BACKGROUND ART

In general chemical processes, heat exchange is performed in various routes which pass through reactors or distillation columns and waste heat generated after heat exchange may be reused or wasted. For example, as shown in FIG. 1, when the waste heat is a low-level heat source in a sensible heat state at a temperature of less than 100° C., for example, 50 to 90° C., the waste heat is unable to be substantially reused due to the excessively low temperature thereof, thereby being condensed by condensate water and then wasted.

Meanwhile, low pressure or high pressure steam is variously used. Particularly, high temperature and high pressure steam is generally used in chemical processes. Generally, atmospheric pressure and room temperature water is heated to the evaporation point and high pressure is applied to the water converted into steam to increase internal energy, thereby generating high temperature and high pressure steam. In this case, to evaporate water in a liquid state, a large amount of energy consumption is necessary.

DISCLOSURE

Technical Problem

The present application provides a heat recovery apparatus and method.

Technical Solution

The present application relates to a heat recovery apparatus. According to the heat recovery apparatus, low-level heat sources at a temperature of less than 100° C. discharged from industrial settings or various chemical processes, for example, a petrochemicals manufacturing process may not be wasted but used to generate steam and the generated steam may be used for various processes to reduce an amount of consumed high-temperature steam that is an external heat source to be used for a reactor or distillation column, thereby maximizing energy reduction efficiency. In addition, the heat recovery apparatus may autonomously produce power consumed by a compressor and may reduce a partial evaporation phenomenon of a refrigerant flow which passes through the compressor, thereby recovering heat with excellent efficiency.

Hereinafter, various embodiments of the present application will be described with reference to the attached drawings. However, the attached drawings are merely examples and will not limit the scope of the heat recovery apparatus according to the present application.

FIG. 2 is a schematic diagram illustrating a heat recovery apparatus 10 according to an exemplary embodiment of the present application.

As shown in FIG. 2, the heat recovery apparatus 10 includes a first circulation loop $R_1$ and a second circulation loop $R_2$. The first and second circulation loops $R_1$ and $R_2$ may be a circulation system connected through a pipe to allow a refrigerant to circulate. As an example, the first circulation loop $R_1$ may be a heat pump cycle and the second circulation loop $R_2$ may be an organic Rankine cycle (ORC). As shown in FIG. 2, the first circulation loop $R_1$ includes an evaporator 100, a first compressor 110, a first condenser 111, and a pressure-dropping device 112. For example, the evaporator 100, the first compressor 110, the first condenser 111, and the pressure-dropping device 112 are connectable through pipes and may be fluidically connected to allow a refrigerant or a fluid to pass through the pipes. As shown in FIG. 2, the second circulation loop $R_2$ also includes the evaporator 100, a turbine 120, a second condenser 121, and a second compressor 122. For example, the evaporator 100, the turbine 120, the second condenser 121, and the second compressor 122 are connectable through pipes and may be fluidic ally connected to allow a refrigerant or a fluid to pass through the pipes.

As an example, the first circulation loop $R_1$ and the second circulation loop $R_2$ share an evaporator. Generally, a heat pump cycle and an organic Rankine cycle may include evaporators, respectively. For example, when the heat pump cycle and the organic Rankine cycle are simply coupled with each other, two evaporators are necessary, thereby consuming an excessive amount of energy to obtain excellent coefficient of performance. However, the heat recovery apparatus 10 according to the embodiment of the present application uses only one evaporator, thereby minimizing energy consumption and having excellent coefficient of performance. Also, the heat recovery apparatus 10 may allow low-temperature heat to become high-temperature heat by coupling two processes having contrary purposes to each other, that is, the heat pump cycle which generates heat using electricity and the organic Rankine cycle which generates electricity using heat. Also, due to a fluid distributor 101 which will be described below, the heat recovery apparatus 10 may properly distribute a fluid flow to the heat pump cycle and the organic Rankine cycle, thereby controlling to additionally produce heat or steam more even though situationally consuming less electricity or to additionally produce electricity even though producing less high-temperature steam. Accordingly, a hybrid process having operational flexibility may be embodied.

In the heat recovery apparatus according to the exemplary embodiment of the present application, the first circulation loop $R_1$ and the second circulation loop $R_2$ share the evaporator 100, and according thereto, a refrigerant flow discharged from the evaporator 100 is divided into and circulate the first circulation loop $R_1$ and the second circulation loop $R_2$, respectively. The refrigerant flows which circulate the first circulation loop $R_1$ and the second circulation loop $R_2$ may interflow and may flow in the evaporator 100.

For example, a refrigerant flow $F_1$ discharged from the evaporator 100 flows into the fluid distributor 101 and the refrigerant flow which flows into the fluid distributor may be separated and may be discharged from the fluid distributor. In this case, one refrigerant flow part $F^A_1$ may flow into the first compressor 110 of the first circulation loop $R_1$ and the other refrigerant flow part $F^B_1$ may flow into the turbine 120 of the second circulation loop $R_2$.

The fluid distributor 101 may be included in the heat recovery apparatus 10 according to the embodiment of the present application to distribute the refrigerant flow discharged from the evaporator 100 in a proper proportion. The refrigerant flow $F_1$ discharged from the evaporator 100 is properly allocated by the fluid distributor 101 and properly distributed into the first circulation loop $R_1$ and the second circulation loop $R_2$ in such a way that the heat recovery apparatus 10 formed by coupling the heat pump cycle and the organic Rankine cycle may have excellent coefficient of performance even when using only one evaporator. Also, as described above, due to the fluid distributor 101, the heat recovery apparatus 10 may properly distribute the fluid flow to the heat pump cycle and the organic Rankine cycle, thereby controlling to additionally produce heat or steam more even though situationally consuming less electricity or to additionally produce electricity even though producing less high-temperature steam. Accordingly, the hybrid process having operational flexibility may be embodied.

As an example, a ratio of a flow rate of the refrigerant flow $F^A_1$ which is separated in the fluid distributor 101 and flows into the first compressor 110 to the entire flow rate of the refrigerant flow $F_1$ discharged from the evaporator 100 may satisfy following Equation 1.

$$0.3 \leq F_c/F_e \leq 0.5 \qquad \text{[Equation 1]}$$

In Equation 1, $F_e$ indicates the flow rate of the refrigerant flow $F^A_1$ which is separated in the fluid distributor 101 and flows into the first compressor 110 and $F_e$ indicates the entire flow rate of the refrigerant flow $F_1$ discharged from the evaporator 100.

That is, the ratio $F_c/F_e$ of the flow rate of the refrigerant flow $F^A_1$ which is separated in the fluid distributor 101 and flows into the first compressor 110 to the entire flow rate of the refrigerant flow $F_1$ discharged from the evaporator 100 may be controlled within a range of 0.3 to 0.5, for example, 0.32 to 0.45 or 0.35 to 0.4 but is not limited thereto.

Also, as an example, a ratio of a flow rate of the refrigerant flow $F^B_1$ which is separated in the fluid distributor 101 and flows into the turbine 120 to the entire flow rate of the refrigerant flow $F_1$ discharged from the evaporator 100 may satisfy following Equation 2.

$$0.5 \leq F_t/F_e \leq 0.7 \qquad \text{[Equation 2]}$$

In Equation 2, $F_t$ indicates the flow rate of the refrigerant flow $F^B_1$ which is separated in the fluid distributor 101 and flows into the turbine 120 and $F_e$ indicates the entire flow rate of the refrigerant flow $F_1$ discharged from the evaporator 100.

That is, the ratio $F_t/F_e$ of the flow rate of the refrigerant flow $F^B_1$ which is separated in the fluid distributor 101 and flows into the turbine 120 to the entire flow rate of the refrigerant flow $F_1$ discharged from the evaporator 100 may be controlled within a range of 0.5 to 0.7, for example, 0.55 to 0.68 or 0.6 to 0.65 but is not limited thereto.

The ratio of the flow rate of the refrigerant flow $F^A_1$ which is separated in the fluid distributor 101 and flows into the first compressor 110 to the entire flow rate of the refrigerant flow $F_1$ discharged from the evaporator 100 satisfies Equation 1 and the ratio of the flow rate of the refrigerant flow $F^B_1$ which is separated in the fluid distributor 101 and flows into the turbine 120 to the entire flow rate of the refrigerant flow $F_1$ discharged from the evaporator 100 satisfies Equation 2, thereby the heat recovery apparatus 10 according to the embodiment of the present application may have excellent coefficient of performance even when using only one evaporator.

The entire flow rate of the refrigerant flow $F_1$ discharged from the evaporator 100, the flow rate of the refrigerant flow $F^A_1$ which is separated in the fluid distributor 101 and flows into the first compressor 110, and the flow rate of the refrigerant flow $F^B_1$ which is separated in the fluid distributor 101 and flows into the turbine 120 are not particularly limited within a range of satisfying Equations 1 and 2 and will be variously controlled according to types and conditions of processes where applicable. As an example, the entire flow rate of the refrigerant flow $F_1$ discharged from the evaporator 100 may be 10,000 kg/hr to 100,000 kg/hr, for example, 20,000 kg/hr to 90,000 kg/hr or 30,000 kg/hr to 80,000 kg/hr, and preferably, may be 45,000 kg/hr to 55,000 kg/hr but is not limited thereto. Also, the flow rate of the refrigerant flow $F^A_1$ which is separated in the fluid distributor 101 and flows into the first compressor 110 may be 5,000 kg/hr to 40,000 kg/hr, for example, 8,000 kg/hr to 35,000 kg/hr or 10,000 kg/hr to 30,000 kg/hr, and preferably, may be 15,000 kg/hr to 25,000 kg/hr but is not limited thereto. Also, the flow rate of the refrigerant flow $F^B_1$ which is separated in the fluid distributor 101 and flows into the turbine 120 may be 5,000 kg/hr to 60,000 kg/hr, for example, 10,000 kg/hr to 50,000 kg/hr or 20,000 kg/hr to 40,000 kg/hr, and preferably, may be 25,000 kg/hr to 35,000 kg/hr but is not limited thereto.

The evaporator 100 is included in the heat recovery apparatus 10 according to the embodiment of the present application to heat-exchange the refrigerant flow with a first fluid flow which flows from the outside. Through the heat exchange, a refrigerant is evaporated, and after that, may be discharged from the evaporator 100 in a relatively high-temperature gaseous flow than a flow which flows into the evaporator 100. In the above, "gaseous" means a state in which a gas element flow is rich among total elements of the refrigerant flow, for example, means a state in which a mole fraction of the gaseous element flow to the total elements of the refrigerant flow is 0.9 to 1.0.

A first fluid flow $W_1$ which flows into the evaporator 100, for example, may be a waste heat flow or a condensed water flow which passes through the condenser. The waste heat flow, for example, may be a refrigerant of an exothermic reactor but is not limited thereto. In the embodiment, particularly, a waste heat flow of a low-level heat source in a sensible heat state at a temperature of less than 100° C., for example, 50 to 90° C. may be desirably used.

For example, a refrigerant flow $F_5$ and the first fluid flow $W_1$ such as the waste heat flow, etc. may flow into the evaporator 100 through a fluidically connected pipe. The refrigerant flow $F_5$ and the first fluid flow $W_1$ which flow in may be mutually heat-exchanged in the evaporator 100 and after that may be discharged from the evaporator 100, respectively, through the fluidically connected pipe.

As an example, a temperature of the refrigerant flow $F_1$ discharged from the evaporator 100 and a temperature of the first fluid flow $W_1$ which flows into the evaporator 100 may satisfy following Equation 3.

$$1° C. \leq T_{Ein} - T_{Eout} \leq 20° C. \qquad \text{[Equation 3]}$$

In Equation 3, $T_{Ein}$ indicates the temperature of the first fluid flow $W_1$ which flows into the evaporator 100 and $T_{Eout}$ indicates the temperature of the refrigerant flow $F_1$ discharged from the evaporator 100.

That is, a difference $T_{Ein} - T_{Eout}$ between the temperature of the refrigerant flow $F_1$ discharged from the evaporator 100 and the temperature of the first fluid flow $W_1$ which flows into the evaporator 100 may be controlled within a range of 1 to 20° C., for example, 1 to 15° C., 2 to 20° C., 1 to 10° C., or 2 to 10° C.

The temperature of the refrigerant flow $F_1$ discharged from the evaporator 100 and the temperature of the first fluid flow $W_1$ which flows into the evaporator 100 satisfy Equation 3, thereby generating high-temperature steam using the waste heat of the low-level heat source in the sensible heat state at a temperature of less than 100° C., for example, 50 to 90° C.

The temperature of the refrigerant flow $F_1$ discharged from the evaporator 100 and the temperature of the first fluid flow $W_1$ which flows into the evaporator 100 are not particularly limited within a range of satisfying Equation 3 and may be variously controlled according to types and conditions of processes where applicable. As an example, the temperature of the first fluid flow $W_1$ which flows into the evaporator 100 may be 60° C. to 100° C., for example, 70° C. to 90° C., 80° C. to 95° C., 80° C. to 85° C., or 83° C. to 87° C. but is not particularly limited thereto. Also, the temperature of the refrigerant flow $F_1$ discharged from the evaporator 100 may be 60° C. to 100° C., for example, 60° C. to 95° C., 65° C. to 90° C., 65° C. to 95° C., or 70° C. to 85° C. but is not particularly limited thereto.

In this case, a temperature of a fluid flow $W_2$ heat-exchanged with the refrigerant flow and then discharged from the evaporator 100 may be 60° C. to 100° C., for example, 60° C. to 95° C., 65° C. to 90° C., 65° C. to 95° C., or 70° C. to 85° C. but is not particularly limited thereto.

Also, the refrigerant flow $F_5$ which flows into the evaporator 100 may be lower than the temperature of the fluid flow $W_1$ which flows into the evaporator 100, for example, may be 40° C. to 90° C., 40° C. to 80° C., or 73° C. to 77° C. but is not limited thereto.

Pressures of the refrigerant flows $F_5$ and $F_1$ each of which flows into and is discharged from the evaporator 100 may vary according to a type and an operating condition of the refrigerant and is not particularly limited. For example, the pressures of the refrigerant flows $F_5$ and $F_1$ each of which flows into and is discharged from the evaporator 100, respectively, may be 2.0 kgf/cm² g to 20.0 kgf/cm² g, for example, 2.0 kgf/cm² g to 10.0 kgf/cm² g, or 2.1 kgf/cm² g to 7.0 kgf/cm² g but is not limited thereto. By controlling the pressure of the refrigerant flow at 2.0 kgf/cm² g to 20.0 kgf/cm² g, a compression ratio of the first compressor 110 can be controlled easily. Generally, outflow pressure of a compressor is determined according to a temperature but a compression ratio may be maintained low when inflow pressure increases. As the compression ratio increases, high-temperature steam may be generated from a low-temperature heat source. In this case, coefficient of performance decreases. As the compression ratio decreases, the coefficient of performance increases but it is difficult to generate the high-temperature steam from the low-temperature heat source. In the above, a pressure unit kgf/cm² g means gauge pressure.

Pressures of the first fluid flows $W_1$ and $W_2$ each of which flows into and is discharged from the evaporator 100, respectively, are not particularly limited, and for example, may be 0.5 kgf/cm² g to 2.0 kgf/cm² g, for example, 0.7 kgf/cm² g to 1.5 kgf/cm² g, or 0.8 kgf/cm² g to 1.2 kgf/cm² g.

Also, a flow rate of the first fluid flow $W_1$ which flows into the evaporator 100 may be 50,000 kg/hr or more, for example, 100,000 kg/hr or more, or 200,000 kg/hr or more, and preferably, 250,000 kg/hr or more but is not limited thereto. As the flow rate of the first fluid flow $W_1$ which flows into the evaporator 100 increases, even though the same calories are transferred to the refrigerant, an outflow temperature of the fluid flow $W_2$ which is discharged after heat transfer is maintained high, and thus an outflow temperature of the refrigerant flow $F_1$ discharged from the evaporator 100 may be maintained high. Accordingly, an upper limit of the flow rate of the first fluid flow $W_1$ which flows into the evaporator 100 is not particularly limited, and considering efficiency and economic feasibility of the apparatus, may be, for example, 500,000 kg/hr or less or 350,000 kg/hr or less but is not limited thereto.

In the first circulation loop $R_1$, the first compressor 110 may be included in the heat recovery apparatus 10 according to the embodiment of the present application to compress the gaseous refrigerant flow $F_1$ discharged from the evaporator 100 and to increase a temperature and pressure thereof. A gaseous refrigerant flow $F^A_2$ which is compressed by passing through the first compressor 110 at relatively higher temperature and pressure than the refrigerant flow $F_1$ discharged from the evaporator 100 may flow into the first condenser 111 which will be described below.

For example, the refrigerant flow $F_1$ discharged from the evaporator 100 may be distributed by the fluid distributor 101 and after that may flow into the first compressor 110 through the fluidically connected pipe. The refrigerant flow $F^A_1$ which flows in may be compressed by the first compressor 110 and may be discharged ($F^A_2$) through the fluidically connected pipe.

As an example, a ratio of a pressure of the refrigerant flow $F^A_1$ which is separated in the fluid distributor 101 and flows into the first compressor 110 to a pressure of the refrigerant flow $F^A_2$ discharged from the first compressor 110 may satisfy following Equation 4.

$$2 \leq P_{C1out}/P_{C1in} \leq 5 \qquad \text{[Equation 4]}$$

In Equation 4, $P_{C1out}$ indicates the pressure (bar) of the refrigerant flow $F^A_2$ discharged from the first compressor 110 and $P_{C1in}$ indicates the pressure (bar) of the refrigerant flow $F^A_1$ which is separated in the fluid distributor 101 and flows into the first compressor 110.

That is, the ratio $P_{C1out}/P_{C1in}$ of the pressure of the refrigerant flow $F^A_1$ which is separated in the fluid distributor 101 and flows into the first compressor 110 to the pressure of the refrigerant flow $F^A_2$ discharged from the first compressor 110 may be controlled within a range of 2 to 5, for example, 2 to 4, and preferably, 3 to 4. The ratio $P_{C1out}/P_{C1in}$ is calculated based on a case in which units of the pressure of the refrigerant flow $F^A_1$ which is separated in the fluid distributor 101 and flows into the first compressor 110 and the pressure of the refrigerant flow $F^A_2$ discharged from the first compressor 110 are bar. It is obvious to a person of ordinary skill in the art that the ratio of the pressure may not satisfy Equation 4 when a detailed pressure value converted according to a unit of measured pressure varies. Accordingly, Equation 4 may include all cases of satisfying while converting measured pressure values into a pressure unit of bar.

The ratio of the pressure of the refrigerant flow $F^A_1$ which is separated in the fluid distributor 101 and flows into the first compressor 110 to the pressure of the refrigerant flow $F^A_2$ discharged from the first compressor 110 satisfies Equation 4, thereby compressing a refrigerant evaporated by the evaporator 100 to be in a high temperature and pressure state to have calories heat-exchangeable with a fluid flow which passes through the first condenser 111 which will be described below.

The ratio of the pressure of the refrigerant flow $F^A_1$ which is separated in the fluid distributor 101 and flows into the first compressor 110 to the pressure of the refrigerant flow $F^A_2$ discharged from the first compressor 110 is not particularly limited within a range of satisfying Equation 4 and may be variously controlled according to types and conditions of processes where applicable. As an example, the pressure of the refrigerant flow $F^A_1$ which is separated in the fluid distributor 101 and flows into the first compressor 110 may be 2.0 kgf/cm² g to 20 kgf/cm² g, for example, 2.0 kgf/cm² g to 10.0 kgf/cm² g, or 2.1 kgf/cm² g to 7.0 kgf/cm² g but is not limited thereto. Also, the pressure of the refrigerant flow $F^A_2$ discharged from the first compressor 110 may be 15 to 30 kgf/cm² g, for example, 18 to 30 kgf/cm² g, or 20 to 30 kgf/cm² g but is not limited thereto.

Also, a temperature of the refrigerant flow $F^A_2$ compressed and discharged from the first compressor 110 may be 110° C. to 170° C., for example, 120° C. to 150° C., or 123° C. to 165° C. but is not limited thereto.

As the first compressor 110, if capable of compressing a gaseous flow, various compression devices well known in the art may be used without limitation. As an example, the first compressor 110 may be a compressor but is not limited thereto.

In the first circulation loop $R_1$, the first condenser 111 may be included in the heat recovery apparatus 10 according to the embodiment of the present application to heat-exchange the high-temperature and pressure refrigerant flow $F^A_2$ discharged from the first compressor 110 with a second fluid flow $W_3$ which flows in from the outside. Through the heat exchange, a refrigerant may be condensed and discharged ($F^A_3$) in a relatively low temperature liquid flow than the refrigerant flow $F^A_2$ discharged from the first compressor 110 and the second fluid flow $W_3$ may absorb latent heat generated while the refrigerant is being condensed. In the above, "liquid" means a state in which a liquid element flow is rich among total elements of the refrigerant flow, for example, means a state in which a mole fraction of the liquid element flow to the total elements of the refrigerant flow is 0.9 to 1.0.

As an example, a second fluid which flows into the first condenser 111 may be makeup water. In this case, water heat-exchanged in the first condenser 111 may be evaporated by absorbing the latent heat generated while the refrigerant is being condensed and may be discharged in a steam state.

For example, the refrigerant flow $F^A_2$ discharged from the first compressor 110 and the second fluid flow $W_3$ for heat-exchanging the refrigerant flow may flow into the first condenser 111 through fluidically connected pipes. The refrigerant flow $F^A_2$ and the second fluid flow $W_3$ which flow in may be mutually heat-exchanged in the first condenser 111 and may be discharged from the first condenser 111 respectively through the fluidically pipes.

A temperature and pressure of the second fluid flow $W_3$ which flows into the first condenser 111 are not particularly limited. Fluid flows at various temperatures and pressures may be allowed to flow into the first condenser. For example, the second fluid flow $W_3$ may flow into the first condenser 111 at a temperature of 110° C. to 120° C., for example, 112° C. to 116° C., or 115° C. to 118° C. and at a pressure of 0.5 to 0.9 kgf/cm² g, for example, 0.6 to 0.8 kgf/cm² g.

Also, a flow rate of the second fluid flow $W_3$ which flows into the first condenser 111 is not particularly limited but may be 300 kg/hr to 6,000 kg/hr, for example, 500 kg/hr to 1,000 kg/hr, 800 kg/hr to 2,000 kg/hr, or 900 kg/hr to 1,100 kg/hr.

As an example, the refrigerant flow $F^A_2$ discharged from the first compressor 110 and water $W_4$ heat-exchanged in the first condenser may be discharged from the first condenser 111 at a temperature of 115° C. to 150° C., for example, 115° C. to 145° C., 120° C. to 140° C., or 115° C. to 137° C. and with a pressure of 0.5 to 2.5 kgf/cm² g, for example, 0.7 to 2.2 kgf/cm² g.

Also, the refrigerant flow $F^A_3$ heat-exchanged with the second fluid flow $W_3$ in the first condenser 111 may be discharged from the first condenser 111 at a temperature of 115° C. to 145° C. or 120° C. to 145° C., and preferably, 124° C. to 143° C. but is not limited thereto. A pressure of the refrigerant flow $F^A_3$ heat-exchanged with the second fluid flow $W_3$ in the first condenser 111 may vary according to a type and operating condition of a refrigerant and may be discharged ($F^A_3$) from the first condenser 111 with the pressure, for example, with the pressure of 15 to 30 kgf/cm² g, 18 to 29.5 kgf/cm² g, or 20 to 29.3 kgf/cm² g but is not limited thereto.

The heat recovery apparatus 10 according to the embodiment of the present application may also additionally include a storage tank 300. As shown in FIG. 2, the storage tank 300 may be provided being fluidically connected to the first condenser 111 through a pipe. The storage tank 300 is an apparatus for supplying a fluid flow which flows into the first condenser 111. In the storage tank 300, a fluid which flows into the first condenser 111, for example, water may be stored.

The second fluid flow $W_3$ discharged from the storage tank 300 flows into the first condenser 111 along the pipe and may be heat-exchanged with the refrigerant flow $F^A_2$ which flows into the first condenser 111. In this case, the heat-exchanged fluid flow $W_4$, for example, high temperature and pressure water may flow again into the storage tank and may be decompressed and discharged in a steam state.

The pressure-dropping device 112 may be included in the heat recovery apparatus 10 to expand the high temperature and pressure liquid refrigerant flow $F^A_3$ discharged from the first condenser 111 and to drop a temperature and pressure thereof. A refrigerant flow $F^A_4$ which is included in the heat recovery apparatus 10 and passes through the pressure-dropping device 112 may flow again into the evaporator 100 in a relatively lower temperature and pressure state than the refrigerant flow discharged from the first condenser 111.

For example, the refrigerant flow $F^A_3$ discharged from the first condenser 111 may flow into the pressure-dropping device 112 through a fluidically connected pipe. The refrigerant flow which flows in may be expanded in the pressure-dropping device 112 and may be discharged through the fluidically connected pipe in a relatively lower temperature and pressure state than the refrigerant flow $F^A_3$ discharged from the first condenser 111. As an example, the refrigerant flow $F^A_4$ discharged from the pressure-dropping device 112 may be discharged from the pressure-dropping device 112 at a temperature of 40° C. to 90° C., for example, 40° C. to 80° C. or 45° C. to 85° C., and preferably, 45° C. to 77° C. but is not limited thereto. Also, a pressure of the refrigerant flow $F^A_4$ discharged from the pressure-dropping device 112 may variously change according to the type and operating condition of the refrigerant and may be discharged from the pressure-dropping device 112 with a pressure of 2.0 kgf/cm² g to 10 kgf/cm² g, for example, 2.5 kgf/cm² g to 8.0 kgf/cm² g or 2.2 kgf/cm² g to 7.0 kgf/cm² g, and preferably, may be 2.0 kgf/cm² g to 6.5 kgf/cm² g but is not limited thereto.

In the first circulation loop, the pressure-dropping device 112, for example, may be a control valve or a turbine installed at a pipe through which the refrigerant flow $F^A_3$ discharged from the first condenser 111 flows.

When the pressure-dropping device 112 is a turbine, the turbine may be a generation device, and for example, may be a hydraulic turbine capable of converting dynamic energy of a refrigerant which flows through a pipe, that is, a fluid into electric energy. When the hydraulic turbine is used, power consumed by the first compressor 110 may be autonomously produced by the heat recovery apparatus 10, thereby increasing coefficient of performance of the heat recovery apparatus.

In the second circulation loop $R_2$, the turbine 120 is included in the heat recovery apparatus 10 according to the embodiment of the present application to produce electricity used by the first compressor 110. When the gaseous refrigerant flow $F_1$ discharged from the evaporator 100 flows into the turbine 120 and a temperature and pressure thereof decrease, enthalpy is lost and work occurs in the turbine 120 as the lost enthalpy. The work which occurs in the turbine 120 may be used in the first compressor 110 described above while compressing.

A refrigerant flow $F^B_2$ which expands while passing through the turbine 120 and is in a relatively lower temperature and pressure gaseous state than the refrigerant flow $F_1$ discharged from the evaporator 100 may flow into the second condenser 121 which will be described below. For example, the refrigerant flow $F_1$ discharged from the evaporator 100 may be distributed by the fluid distributor 101 described above, and after that, may flow into the turbine 120 through a fluidically connected pipe. The refrigerant flow $F^B_1$ which flows in may be expanded by the turbine 120 and may be discharged ($F^B_2$) through the fluidically connected pipe.

In the second circulation loop $R_2$, the second condenser 121 is included in the heat recovery apparatus 10 according to the embodiment of the present application to condense the low temperature and pressure refrigerant flow $F^B_2$ discharged from the turbine 120. Through the second condenser 121, the refrigerant may be condensed and may be discharged ($F^B_3$) in a relatively lower temperature and pressure liquid flow than the refrigerant flow $F^B_2$ discharged from the turbine.

In the second circulation loop $R_2$, the second compressor 122 may be included in the heat recovery apparatus 10 according to the embodiment of the present application to compress a liquid refrigerant flow $F^B_3$ discharged from the second condenser 121 and to increase a temperature and pressure thereof. A refrigerant flow $F^B_4$ which is compressed while passing through the second compressor 122 and in a relatively higher temperature and pressure gaseous state than the refrigerant flow $F^B_3$ discharged from the second condenser 121 may flow into a fluid mixer 102 and then into the evaporator 100 described above.

For example, the refrigerant flow $F^B_3$ discharged from the second condenser 121 may flow into the second compressor 122 through a fluidically connected pipe. The refrigerant flow $F^B_3$ which flows in may be compressed by the second compressor 122 and may be discharged ($F^B_4$) through the fluidically connected pipe.

As an example, a ratio of a pressure of the refrigerant flow $F^B_3$ which is discharged from the second condenser 121 and flows into the second compressor 122 to a pressure of the refrigerant flow $F^B_4$ discharged from the second compressor 122 may satisfy following Equation 5.

$$2 \le P_{C2out}/P_{C2in} \le 7 \quad \text{[Equation 5]}$$

In Equation 5, $P_{C2out}$ indicates the pressure (bar) of the refrigerant flow $F^B_4$ discharged from the second compressor 122 and $P_{C2in}$ indicates the pressure (bar) of the refrigerant flow $F^B_3$ which is discharged from the second condenser 121 and flows into the second compressor 122.

That is, the ratio $P_{C2out}/P_{C2in}$ of the pressure of the refrigerant flow $F^B_3$ which is discharged from the second condenser 121 and flows into the second compressor 122 to the pressure of the refrigerant flow $F^B_4$ discharged from the second compressor 122 may be controlled within a range of 2 to 7, for example, 2 to 5, and preferably, 2.5 to 4.5. The ratio $P_{C2out}/P_{C2in}$ is calculated based on a case in which units of the pressure of the refrigerant flow $F^B_3$ which is discharged from the second condenser 121 and flows into the second compressor 122 and the pressure of the refrigerant flow $F^B_4$ discharged from the second compressor 122 are bar. It is obvious to a person of ordinary skill in the art that the ratio of the pressure may not satisfy Equation 5 when a detailed pressure value converted according to a unit of measured pressure varies. Accordingly, Equation 5 may include all cases of satisfying while converting measured pressure values into a pressure unit of bar.

As the ratio of the pressure of the refrigerant flow $F^B_3$ which is discharged from the second condenser 121 and flows into the second compressor 122 to the pressure of the refrigerant flow $F^B_4$ discharged from the second compressor 122 satisfies Equation 5, it is possible to perform compression to generate electricity and compensate dropped pressure in the turbine 120.

The ratio of the pressure of the refrigerant flow $F^B_3$ which is discharged from the second condenser 121 and flows into the second compressor 122 to the pressure of the refrigerant flow $F^B_4$ discharged from the second compressor 122 is not particularly limited within a range of satisfying Equation 5 and may be variously controlled according to types and conditions of processes where applicable. As an example, the pressure of the refrigerant flow $F^B_3$ which is discharged from the second condenser 121 and flows into the second compressor 122 may be 0.5 kgf/cm² g to 3.0 kgf/cm² g, for example, 1.2 kgf/cm² g to 2.5 kgf/cm² g, or 1.0 kgf/cm² g to 2.0 kgf/cm² g but is not limited thereto. Also, the pressure of the refrigerant flow $F^B_4$ discharged from the second compressor 122 may be 2.0 kgf/cm² g to 20.0 kgf/cm² g, for example, 2.0 kgf/cm² g to 10.0 kgf/cm² g, or 2.2 kgf/cm² g to 7.0 kgf/cm² g but is not limited thereto.

The refrigerant flow $F^B_4$ compressed by and then discharged from the second compressor 122 and the refrigerant flow $F^A_4$ discharged from the pressure-dropping device 112 of the first circulation loop $R_1$ may merge in the fluid mixer 102 and may flow into the evaporator 100.

As the second compressor 122, if capable of compressing a liquid flow, various compression devices well known in the art may be used without limitation. As an example, the second compressor 122 may be a pump but is not limited thereto.

In the heat recovery apparatus 10 according to the embodiment of the present application, a refrigerant flow which passes through the evaporator 100, the first compressor 110, the first condenser 111, and the pressure-dropping device 112 included in the first circulation loop $R_1$ and a refrigerant flow which passes through the evaporator 100, the turbine 120, the second condenser 121, and the second compressor 122 included in the second circulation loop $R_2$ have different temperature and pressure properties, respectively, and flow into or are discharged from the evaporator 100, the first compressor 110, the first condenser 111, the pressure-dropping device 112, the turbine 120, the second condenser 121, and the second compressor 122, thereby using latent heat according to changes in temperature, pressure, and state of the refrigerant flow as a heat source for generating steam. Also, the heat recovery apparatus 10 according to the embodiment of the present application may set optimal temperature and pressure conditions for generating steam using waste heat at a temperature of less than 100° C., thereby generating the steam with excellent efficiency.

As an example, the refrigerant flow $F_5$ which flows into the evaporator 100 may be a liquid flow and a volume fraction of the liquid flow in the refrigerant flow may be 0.8 to 1.0, for example, 0.9 to 1.0, and preferably, 0.99 to 1.0.

Also, the refrigerant flow $F^A_2$ or $F^B_2$ discharged from the first compressor 110 or the turbine 120 may be a gaseous flow and a volume fraction of the gaseous flow in the refrigerant flow may be 0.8 to 1.0, for example, 0.9 to 1.0, and preferably, 0.99 to 1.0.

The refrigerant flow $F^A_3$, $F^B_3$, or $F^B_4$ discharged from the first condenser 111, the second condenser 121, or the second compressor 122 may be a liquid flow and a volume fraction of the liquid flow in the refrigerant flow may be 0.8 to 1.0, for example, 0.9 to 1.0, and preferably, 0.99 to 1.0.

Also, the refrigerant flow $F^A_4$ discharged from the pressure-dropping device 112 may be a liquid flow and a volume fraction of the liquid flow in the refrigerant flow may be 0 to 0.2, for example, 0 to 0.15, and preferably, 0 to 0.1.

In the above, a volume fraction indicates a ratio of a volume flow rate of a liquid flow or a gaseous flow to a volume flow rate of the entire refrigerant flow which flows through the pipe. The volume flow rate indicates a volume of a fluid which flows per unit time and may be obtained through following Equation 7.

$$\text{Volume flow rate} = Av(m^3/s) \quad \text{[Equation 7]}$$

In Equation 7, A indicates a cross sectional area ($m^2$) of a pipe and v indicates a flow velocity (m/s) of a refrigerant flow.

As an example, the heat recovery apparatus 10 according to another embodiment of the present application includes a first heat exchanger 113. FIG. 3 is a schematic diagram illustrating another example of the heat recovery apparatus 10 according to another embodiment of the present application.

As shown in FIG. 3, the heat recovery apparatus 10 according to the embodiment of the present application further includes the first heat exchanger 113 located between the evaporator 100 and the fluid distributor 101 and between the first condenser 111 and the pressure-dropping device 112. For example, the first heat exchanger 113 may be connected to a pipe connected between the evaporator 100 and the fluid distributor 101 and a pipe connected between the first condenser 111 and the pressure-dropping device 112. As an example, the first heat exchanger 113 may be fluidically connected to the pipes to allow a refrigerant flow $F_{1-1}$ discharged from the evaporator 100 to pass through the first heat exchanger 113 and then to flow into ($F^A_1$) the first compressor 110 and to allow a refrigerant flow $F^A_{3-1}$ discharged from the first condenser 111 to pass through the first heat exchanger 113 and then to flow into ($F^A_{3-2}$) the pressure-dropping device 112. The heat recovery apparatus 10 according the embodiment of the present application includes the first heat exchanger 113, thereby preventing an evaporation phenomenon of a part of a refrigerant, generated while isentropic-compressing the refrigerant. Accordingly, heat exchange efficiency of the heat recovery apparatus 10 may be increased. In the above, "isentropic-compressing" means compressing in a condition of uniformly maintaining entropy of a system, for example, may mean an adiabatic compression process of compressing in a state without heat exchange with surroundings of the system.

FIG. 4 is a graph illustrating a temperature-entropy diagram of a refrigerant according to an exemplary embodiment of the present application. As an example, the refrigerant which circulates through the heat recovery apparatus 10, as shown in FIG. 4, may be a refrigerant in which a slope of a tangent line of a saturated vapor curve of the temperature-entropy diagram has a positive slope. For example, the slope of the tangent line of the saturated vapor curve of the temperature-entropy diagram of the refrigerant, in which a horizontal axis is entropy (j/kg·K) and a vertical axis is a temperature (° C.) may be 1 to 3 at a temperature of 50° C. to 130° C. The saturated vapor curve in the temperature-entropy diagram means a curve portion in the right of the diagram based on a critical point of the diagram. That is, as shown in FIG. 4, in the temperature-entropy diagram of the refrigerant, when the refrigerant is isentropic-compressed (in a direction of an arrow in FIG. 4), since the slope of the tangent line of the saturated vapor curve of the refrigerant has the positive slope, a section in which a phase change from a gaseous phase to a liquid phase occurs is present, thereby generating a phenomenon of evaporating a part of a refrigerant flow in the first compressor 110. To prevent the partial evaporation phenomenon of the refrigerant, the heat recovery apparatus 10 according to the embodiment of the present application may include the first heat exchanger 113, thereby increasing the heat exchange efficiency of the heat recovery apparatus 10.

As the refrigerant, various refrigerants well known in the art, in which a slope of a tangent line of a saturated vapor curve of a temperature-entropy diagram has a positive value, may be used but is not limited thereto. For example, one or more refrigerants selected from the group consisting of R245fa, R1234ze, and R1234yf may be used.

As shown in FIG. 3, in the first circulation loop $R_1$ of the heat recovery apparatus 10 according to another embodiment of the present application, the refrigerant flow $F_{1-1}$ discharged from the evaporator 100 flows into the first heat exchanger 113 and then flows into ($F^A_1$) the first compressor, the refrigerant $F^A_{3-1}$ discharged from the first condenser 111 flows into the first heat exchanger 113 and then flows into ($F^A_{3-2}$) the pressure-dropping device 112, and the refrigerant flow $F_{1-1}$ discharged from the evaporator 100 and the refrigerant flow $F^A_{3-1}$ discharged from the first condenser 111 may be heat-exchanged in the first heat exchanger 113.

As an example, a temperature of the refrigerant flow $F^A_{3-1}$ which is discharged from the first condenser 111 and flows into the first heat exchanger 113 and a temperature of a refrigerant flow $F_{1-2}$ which is discharged from the first heat exchanger 113 and flows into the fluid distributor 101 may satisfy following Equation 6.

$$1°\,C. \leq T_{R1in} - T_{R1out} \leq 50°\,C. \quad \text{[Equation 6]}$$

In Equation 6, $T_{R1in}$ indicates the temperature of the refrigerant flow $F^A_{3-1}$ which is discharged from the first condenser 111 and flows into the first heat exchanger 113 and $T_{R1out}$ indicates the temperature of the refrigerant flow $F_{1-2}$ which is discharged from the first heat exchanger 113 and flows into the fluid distributor 101.

That is, a difference $T_{R1in} - T_{R1out}$ of the temperatures of the refrigerant flow $F^A_{3-1}$ which is discharged from the first condenser 111 and flows into the first heat exchanger 113 and the refrigerant flow $F_{1-2}$, which is discharged from the first heat exchanger 113 and flows into the fluid distributor 101 may be controlled within a range of 1 to 50° C., for example, 5 to 45° C., 5 to 50° C., 10 to 45° C., 1 to 40° C., or 15 to 35° C.

The temperature of the refrigerant flow $F^A_{3-1}$ which is discharged from the first condenser 111 and flows into the first heat exchanger 113 and the temperature of the refrigerant flow $F_{1-2}$, which is discharged from the first heat exchanger 113 and flows into the fluid distributor 101 satisfy Equation 6, thereby fully increasing the temperature of the refrigerant flow which flows into the first compressor 110 to prevent the partial evaporation phenomenon of the refrigerant described above. Accordingly, the heat exchange efficiency of the heat recovery apparatus 10 may be increased.

The temperature of the refrigerant flow $F^A_{3-1}$ which is discharged from the first condenser 111 and flows into the first heat exchanger 113 and the temperature of the refrigerant flow $F_{1-2}$, which is discharged from the first heat exchanger 113 and flows into the fluid distributor 101 are not particularly limited within a range of satisfying Equation 6 and may be variously controlled according to types and conditions of processes where applicable. As an example, the temperature of the refrigerant flow $F^A_{3-1}$ which is discharged from the first condenser 111 and flows into the first heat exchanger 113 may be 115° C. to 150° C., for example, 118° C. to 145° C., 120° C. to 148° C., or 120° C. to 145° C. but is not limited thereto. Also, the refrigerant flow $F_{1-2}$, which is discharged from the first heat exchanger 113 and flows into the fluid distributor 101 may flow into the fluid distributor 101 at a temperature of 90° C. to 150° C., for example, 90° C. to 130° C., 90° C. to 120° C., 100° C. to 130° C., or 90° C. to 128° C.

As an example, a temperature of a refrigerant flow $F^A_{3-2}$ which is discharged from the first heat exchanger 113 and flows into the pressure-dropping device 112 may be 70° C. to 120° C., for example, 75° C. to 120° C., or 80° C. to 120° C. but is not particularly limited thereto, and the temperature of the refrigerant flow $F^A_2$ which is discharged from the first compressor 110 and flows into the first condenser 111 may be 110° C. to 170° C., for example, 130° C. to 150° C., 135° C. to 170° C., or 135° C. to 165° C. but is not limited thereto.

The heat recovery apparatus 10 according to the embodiment of the present application includes the first heat exchanger 113, thereby preventing the partial evaporation phenomenon of the refrigerant in the first compressor 110. In this case, the refrigerant flow $F^A_2$ discharged from the first compressor 110 may be a gaseous flow and a volume fraction of the gaseous flow in the refrigerant flow $F^A_2$ discharged from the first compressor 110 may be 0.95 to 1.0, for example, 0.99 to 1.0, and preferably, may be 1.0.

As still another example, the heat recovery apparatus 10 according to the embodiment of the present application includes a second heat exchanger 123. FIG. 5 is a schematic diagram of the heat recovery apparatus 10 according to still another embodiment of the present application.

As shown in FIG. 5, the heat recovery apparatus 10 according to the embodiment of the present application further includes the second heat exchanger 123 located between the turbine 120 and the second condenser 121 and between the second compressor 122 and the fluid mixer 102. For example, the second heat exchanger 123 may be connected to a pipe connected between the turbine 120 and the second condenser 121 and a pipe connected between the second compressor 122 and the fluid mixer 102. As an example, the second heat exchanger 123 may be fluidically connected to the pipes to allow a refrigerant flow $F^B_{2-1}$ discharged from the turbine 120 to pass through the second heat exchanger 123 and then to flow into ($F^B_{2-2}$) the second condenser 121 and to allow a refrigerant flow $F^B_{4-1}$ discharged from the second compressor 122 to pass through the second heat exchanger 123 and then to flow into ($F^B_{4-2}$) the fluid mixer 102.

As an example, the refrigerant flow $F^B_{2-1}$ discharged from the turbine 120 may flow into the second heat exchanger 123 at a temperature of 90° C. to 120° C., for example, 90° C. to 115° C., or 95° C. to 112° C. and the refrigerant flow $F^B_{2-1}$ discharged from the turbine may pass through the second heat exchanger 123 and may flow into ($F^B_{2-2}$) the second condenser 121 at a temperature of 50° C. to 75° C., for example, 55° C. to 70° C., or 50° C. to 70° C. but is not limited thereto.

As an example, the refrigerant flow $F^B_3$ discharged from the second condenser 121 may flow into the second compressor 122 at a temperature of 30° C. to 50° C., for example, 35° C. to 45° C., or 35° C. to 40° C. but is not limited thereto.

Also, the refrigerant flow $F^B_{4-1}$ discharged from the second compressor 122 may flow into ($F^B_{4-1}$) the second heat exchanger 123 at a temperature of 30° C. to 50° C., for example, 35° C. to 45° C., or 35° C. to 40° C. and the refrigerant flow $F^B_{4-1}$ discharged from the second compressor 122 may pass through the second heat exchanger 123 and then flow into the fluid mixer 102 at a temperature of 40° C. to 70° C., for example, 45° C. to 65° C., or 40° C. to 65° C. and then flow into ($F^B_{4-2}$) the evaporator 100 but is not limited thereto.

As yet another example, the heat recovery apparatus 10 according to the embodiment of the present application, as shown in FIG. 6, may include both the first heat exchanger 113 and the second heat exchanger 123 and effects according thereto are identical to those described above. FIG. 6 is a schematic diagram of the heat recovery apparatus 10 according to yet another embodiment of the present application.

According to even another embodiment of the present application, a heat recovery method is provided. The heat recovery method according to the exemplary embodiment may be performed using the heat recovery apparatus 10 described above. Through this, as described above, low-level heat sources at a temperature of less than 100° C. discharged from industrial settings or various chemical processes, for example, a petrochemicals manufacturing process may not be wasted but used to generate steam and the generated steam may be used for various processes to reduce an amount of consumed high-temperature steam that is an external heat source to be used for a reactor or distillation column, thereby maximizing energy reduction efficiency In addition, the heat recovery method according to the embodiment of the present application may autonomously produce power consumed by a compressor and may reduce a partial evaporation phenomenon of a refrigerant flow which passes through the compressor, thereby recovering heat with excellent efficiency.

The heat recovery method according to one embodiment of the present application includes a refrigerant circulation step, a first heat exchange step, and a second heat exchange step.

The refrigerant circulation step may include a first circulation step and a second circulation step. The first circulation state may be a stage in which a refrigerant circulates through the first circulation loop $R_1$ described above, and the second circulation step may be a stage in which the refrigerant circulates through the second circulation loop $R_2$.

As an example, in the first circulation step, a refrigerant flow is allowed to sequentially circulate through the evaporator 100, the first compressor 110, the first condenser 111, and the pressure-dropping device 112. For example, in the first circulation step, (a-i) the refrigerant flow may be allowed to flow into the evaporator 100, (a-ii) one part of a refrigerant flow $F_1$ discharged from the evaporator 100 may be allowed to flow into the first compressor 110, (a-iii) a refrigerant flow $F^A_2$ discharged from the first compressor 110 may be allowed to flow into the first condenser 111, (a-iv) a refrigerant flow $F^A_3$ discharged from the first condenser 111 may be allowed to flow into the pressure-dropping device 112, and (a-v) a refrigerant flow $F^A_4$ discharged from the pressure-dropping device may be allowed to flow again into the evaporator 100.

Also, in the second circulation step, a refrigerant flow is allowed to sequentially circulate through the evaporator 100, the turbine 120, the second condenser 121, and the second compressor 122. For example, in the second circulation step, (b-i) the other part of the refrigerant flow $F_1$ discharged from the evaporator 100 may be allowed to flow into the turbine 120, (b-ii) a refrigerant flow $F^B_2$ discharged from the turbine 120 may be allowed to flow into the second condenser 121, (b-iii) a refrigerant flow $F^B_3$ discharged from the second condenser 121 may be allowed to flow into the second compressor 122, and (b-iv) a refrigerant flow $F^B_4$ discharged from the second compressor 122 may be allowed to flow again into the evaporator 100.

Also, the heat recovery method includes the first heat exchange step of heat-exchanging a refrigerant flow $F_5$ which flows into the evaporator 100 with a first fluid flow $W_1$ which flows into the evaporator 100 and the second heat exchange step of heat-exchanging the refrigerant flow $F^A_2$ discharged from the first compressor with a second fluid flow $W_3$ which flows into the first condenser.

The refrigerant circulation step, the first heat exchange step, and the second heat exchange step may be sequentially performed or may be independently performed from one another regardless of order. Also, since the operations (a-i) to (a-v) of the first circulation step and the operations (b-i) to (b-iv) of the second circulation step are circulating operations, when the refrigerant flow is allowed to circulate as described above, it is possible to perform any operation first.

As an example, a ratio of a flow rate of the refrigerant flow $F^A_1$ which flows into the first compressor 110 to an entire flow rate of the refrigerant flow $F_1$ discharged from the evaporator 100 may satisfy following Equation 1.

$$0.3 \leq F_c/F_e \leq 0.5 \quad \text{[Equation 1]}$$

In Equation 1, $F_c$ indicates the flow rate of the refrigerant flow $F^A_1$ which flows into the first compressor 110 and $F_e$ indicates the entire flow rate of the refrigerant flow $F_1$ discharged from the evaporator 100.

Also, as an example, a ratio of a flow rate of the refrigerant flow $F^B_1$ which flows into the turbine 120 to the entire flow rate of the refrigerant flow $F_1$ discharged from the evaporator 100 may satisfy following Equation 2.

$$0.5 \leq F_t/F_e \leq 0.7 \quad \text{[Equation 2]}$$

In Equation 2, $F_t$ indicates the flow rate of the refrigerant flow $F^B_1$ which is separated in the fluid distributor 101 and flows into the turbine 120 and $F_e$ indicates the entire flow rate of the refrigerant flow $F_1$ discharged from the evaporator 100.

The ratio of the flow rate of the refrigerant flow $F^A_1$ which flows into the first compressor 110 to the entire flow rate of the refrigerant flow $F_1$ discharged from the evaporator 100 satisfies Equation 1 and the ratio of the flow rate of the refrigerant flow $F^B_1$ which flows into the turbine 120 to the entire flow rate of the refrigerant flow $F_1$ discharged from the evaporator 100 satisfies Equation 2, thereby allowing the heat recovery apparatus to have excellent coefficient of performance when the heat recovery apparatus 10 according to the embodiment of the present application uses only one evaporator.

Also, in the heat recovery method according to the embodiment of the present application, a detailed description on flow rate conditions of the entire flow rate of the refrigerant flow discharged from the evaporator 100, the flow rate of the refrigerant flow $F^A_1$ which flows into the first compressor 110, and the refrigerant flow $F^B_1$ which flows into the turbine 120 is identical to that described above with respect to the heat recovery apparatus 10 and will be omitted.

As an example, in the heat recovery method, a temperature of the refrigerant flow $F_1$ discharged from the evaporator 100 and a temperature of the first fluid flow $W_1$ which flows into the evaporator 100 may satisfy following Equation 3.

$$1° C. \leq T_{Ein} - T_{Eout} \leq 20° C. \quad \text{[Equation 3]}$$

In Equation 3, $T_{Ein}$ indicates the temperature of the first fluid flow $W_1$ which flows into the evaporator 100 and $T_{Eout}$ indicates the temperature of the refrigerant flow $F_1$ discharged from the evaporator 100.

The temperature of the refrigerant flow $F_1$ discharged from the evaporator 100 and the temperature of the first fluid flow $W_1$ which flows into the evaporator 100 satisfy Equation 3, thereby generating high-temperature steam using low-temperature waste heat, particularly, less than 100° C., for example, waste heat of a low-level heat source in a sensible heat state, for example, 50 to 90° C. A detailed description on the temperature of the refrigerant flow $F_1$ discharged from the evaporator 100 and the temperature of the first fluid flow $W_1$ which flows into the evaporator 100 is identical to that described above with respect to the heat recovery apparatus 10 and will be omitted.

Also, in the heat recovery method according to the embodiment of the present application, a ratio of a pressure of the refrigerant flow $F^A_1$ which flows into the first compressor 110 to a pressure of the refrigerant flow $F^A_2$ discharged from the first compressor 110 may satisfy following Equation 4.

$$2 \leq P_{C1out}/P_{C1in} \leq 5 \quad \text{[Equation 4]}$$

In Equation 4, $P_{C1out}$ indicates the pressure (bar) of the refrigerant flow $F^A_2$ discharged from the first compressor 110 and $P_{C1in}$ indicates the pressure (bar) of the refrigerant flow $F^A_1$ which flows into the first compressor 110.

The ratio of the pressure of the refrigerant flow $F^A_1$ which flows into the first compressor 110 to the pressure of the refrigerant flow $F^A_2$ discharged from the first compressor 110 satisfies Equation 4, thereby compressing a refrigerant evaporated by the evaporator 100 to be in a high temperature and pressure state to have calories heat-exchangeable with the second fluid flow $W_3$ which passes through the first condenser 111 which will be described below. A detailed description on conditions of the pressure of the refrigerant flow $F^A_1$ which flows into the first compressor 110 and the pressure of the refrigerant flow $F^A_2$ discharged from the first compressor is identical to that described above with respect to the heat recovery apparatus 10 and will be omitted.

A ratio of a pressure of the refrigerant flow $F^B_3$ which is discharged from the second condenser 121 and flows into the second compressor 122 to a pressure of the refrigerant flow $F^B_4$ discharged from the second compressor 122 may satisfy following Equation 5.

$$2 \leq P_{C2out}/P_{C2in} \leq 7 \quad \text{[Equation 5]}$$

In Equation 5, $P_{C2out}$ indicates the pressure (bar) of the refrigerant flow $F^B_4$ discharged from the second compressor 122 and $P_{C2in}$ indicates the pressure (bar) of the refrigerant flow $F^B_3$ which is discharged from the second condenser 121 and flows into the second compressor 122.

As the ratio of the pressure of the refrigerant flow $F^B_3$ which is discharged from the second condenser 121 and flows into the second compressor 122 to the pressure of the refrigerant flow $F^B_4$ discharged from the second compressor 122 satisfies Equation 5, it is possible to perform compression to generate electricity and compensate dropped pressure in the turbine 120. A detailed description on conditions of the pressure of the refrigerant flow $F^B_3$ which is discharged from the second condenser 121 and flows into the second compressor 122 and the pressure of the refrigerant flow $F^B_4$ discharged from the second compressor 122 is identical to that described above with respect to the heat recovery apparatus 10 and will be omitted.

Also, in the heat recovery method, detailed temperature, pressure, and flow rate conditions are identical to those described above with respect to the heat recovery apparatus 10 and a description thereof will be omitted.

In the heat recovery method according to another embodiment of the present application, the refrigerant in the first circulation step and the second circulation step of the refrigerant circulation step may be a refrigerant in which a slope of a tangent line of a saturated vapor curve of a temperature-entropy diagram has a positive slope. For example, a horizontal axis may be entropy (J/kg·K), a vertical axis may be a temperature (° C.) and the slope of the tangent line of the saturated vapor curve of the temperature-entropy diagram may be 1 to 3 at a temperature of 50° C. to 130° C. Also, in this case, the first circulation step may further include allowing a refrigerant flow $F_{1-1}$ discharged from the evaporator 100 to flow into the first heat exchanger 113 and then to flow into ($F^A_1$) the first compressor 110 and allowing a refrigerant flow $F^A_{3-1}$ discharged from the first condenser 111 to flow into the first heat exchanger 113 and then to flow into ($F^A_{3-2}$) the pressure-dropping device 112.

In the case described above, the heat recovery method according to still another embodiment of the present application may further include a third heat exchange step of heat-exchanging the refrigerant flow $F_{1-1}$ discharged from the evaporator 100 with the refrigerant flow $F^A_{3-1}$ discharged from the first condenser 111 in the first heat exchanger 113. The third heat exchange step may be performed through the first heat exchanger 113 of the heat recovery apparatus 10. Accordingly, as described above, it is possible to prevent the partial evaporation phenomenon which occurs while isentropic-compressing a refrigerant and to increase the heat exchange efficiency of the heat recovery apparatus 10.

As an example, a temperature of the refrigerant flow $F^A_3$-1 which is discharged from the first condenser 111 and flows into the first heat exchanger 113 and a temperature of a refrigerant flow $F_{1-2}$ which is discharged from the first heat exchanger 113 and flows into the fluid distributor 101 may satisfy following Equation 6.

$$5° C. \leq T_{R1in} - T_{R1out} \leq 20° C. \quad \text{[Equation 6]}$$

In Equation 6, $T_{R1in}$ indicates the temperature of the refrigerant flow $F^A_{3-1}$ which is discharged from the first condenser 111 and flows into the first heat exchanger 113 and $T_{R1out}$ indicates the temperature of the refrigerant flow $F_{1-2}$ which is discharged from the first heat exchanger 113 and flows into the fluid distributor 101.

The temperature of the refrigerant flow $F^A_{3-1}$ which is discharged from the first condenser 111 and flows into the first heat exchanger 113 and the temperature of the refrigerant flow $F_{1-2}$ which is discharged from the first heat exchanger 113 and flows into the fluid distributor 101 satisfy Equation 6, thereby fully increasing the temperature of the refrigerant flow $F^A_1$ which flows into the first compressor to prevent the partial evaporation phenomenon of the refrigerant described above. Accordingly, it is possible to increase the heat exchange efficiency of the heat recovery apparatus 10.

Also, in the third heat exchange step, detailed temperature, pressure, and flow rate conditions of a refrigerant flow are identical to those described above with respect to the heat recovery apparatus 10 and a description thereof will be omitted.

In the heat recovery method according to yet another embodiment of the present application, the second circulation step may further include allowing a refrigerant flow $F^B_{2-1}$ discharged from the turbine 120 to flow into the second heat exchanger 123 and then to flow into ($F^B_{2-2}$) the second condenser 121 and allowing a refrigerant flow $F^B_{4-1}$ discharged from the second compressor 122 to flow into the second heat exchanger 123 and then to flow into ($F^B_{4-2}$) the evaporator 100.

Also, in the case described above, the heat recovery method may further include a fourth heat exchange step of heat-exchanging the refrigerant flow $F^B_{2-1}$ discharged from the turbine 120 with the refrigerant flow $F^B_{4-1}$ discharged from the second compressor 122 in the second heat exchanger 123.

The fourth heat exchange step may be performed through the second heat exchanger 123 of the heat recovery apparatus 10 described above. In the fourth heat exchange step, detailed temperature, pressure, and flow rate conditions of a refrigerant flow are identical to those described above with respect to the heat recovery apparatus 10 and will be omitted.

In the heat recovery method according to even another embodiment of the present application, the second fluid $W_3$ which flows into the first condenser 111 may be make-up water. Also, the heat recovery method according to an exemplary embodiment of the present application may further include a steam generating stage of discharging water heat-exchanged with a refrigerant flow which flows into the first condenser 111 as steam.

Also, as another example, the heat recovery method may further include a stage of condensing and discharging a fluid flow discharged from the evaporator 100.

The heat recovery apparatus 10 and method according to the embodiment of the present application may be applied to various petrochemical processes.

For example, in the case of an iodine reaction process while manufacturing n-butanol, a temperature of waste heat which occurs in the process is about 85° C. In this case, since calories about 7.6 Gcal/hr are wasted, it is possible to be applied to the iodine reaction process. Also, in the case of a process of manufacturing cumene through an alkylation reaction, since calories about 6.8 Gcal/hr are wasted, it is possible to be applied to the process of manufacturing cumene. Also, in a process of manufacturing acrylic acid, a temperature of waste heat which occurs in an absorber is about 75° C. In this case, since calories of about 1.6 to about 3.4 Gcal/hr are wasted, it is possible to be applied to the process of manufacturing acrylic acid.

Advantageous Effects

According to the heat recovery apparatus and method according to the embodiment of the present application, low-level heat sources at a temperature less than 100° C. discharged from industrial settings or various chemical processes, for example, a petrochemicals manufacturing process are not wasted but used to generate steam and the generated steam is used for various processes to reduce an amount of consumed high-temperature steam that is an external heat source to be used for a reactor or distillation column, thereby not only maximizing energy reduction efficiency but also autonomously producing power consumed by a compressor. Also, an evaporation phenomenon of a part of a refrigerant flow which passes through the compressor may be reduced, thereby recovering heat with excellent efficiency.

BRIEF DESCRIPTION OF DRAWINGS

FIG. 1 is a schematic diagram of a conventional waste heat processing apparatus.
FIG. 2 is a schematic diagram illustrating a heat recovery apparatus according to one embodiment of the present application.
FIG. 3 is a schematic diagram of a heat recovery apparatus according to another embodiment of the present application.
FIG. 4 is a graph illustrating a temperature entropy diagram of a refrigerant according to an exemplary embodiment of the present application.
FIG. 5 is a schematic diagram of a heat recovery apparatus according to still another embodiment of the present application.
FIG. 6 is a schematic diagram of a heat recovery apparatus according to yet another embodiment of the present application.
FIG. 7 is a heat recovery apparatus according to an example of the present application.

MODE FOR INVENTION

Hereinafter, experimental examples of the present application and comparative examples will be described in detail. However, the scope of the present application is not limited to following embodiments.

Example 1

Steam was generated using a heat recovery apparatus of FIG. 5.
A refrigerant 1,1,1,3,3-pentafluoropropane (R245fa) was allowed to flow into an evaporator and to circulate to allow one part of a refrigerant flow separated from the evaporator to sequentially pass through a compressor, a first condenser, and a pressure-dropping device. In detail, a refrigerant flow in a state of 69.6° C., 6.2 kgf/cm$^2$ g (7.1 bar), and a gas volume fraction of 0.0 was allowed to flow into the evaporator at a flow rate of 50,000 kg/hr, and simultaneously, a waste heat flow in a state of 85.0° C., 1.0 kgf/cm$^2$ (1.96 bar), and a gas volume fraction of 0.0 was allowed to flow into the evaporator at a flow rate of 300,000 kg/hr to be heat-exchanged. After the heat-exchange, the waste heat flow was discharged in a state of 78.2° C., 1.0 kgf/cm$^2$ g (1.96 bar), and a gas volume fraction of 0.0 at a flow rate of 300,000 kg/hr and the refrigerant flow was discharged in a state of 80.0° C., 6.2 kgf/cm$^2$ g (7.1 bar), and a gas volume fraction of 1.0 and flowed into a fluid distributor. The refrigerant flow separated in the fluid distributor was allowed to flow into the compressor at a flow rate of 19,000 kg/hr, and the refrigerant flow compressed by the compressor was discharged from the compressor in a state of 125.0° C., 20.7 kgf/cm$^2$ g (21.3 bar), and a gas volume fraction of 0.82. In this case, an amount of work used in the compressor was 135583.0 W. The refrigerant flow discharged from the compressor was allowed to flow into the first condenser, and simultaneously, water in a state of 115.0° C., 0.7 kgf/cm$^2$ g (1.67 bar), and a gas volume fraction of 0.0 was allowed to flow into the first condenser at a flow rate of 1,000 kg/hr and heat-exchanged with the refrigerant flow. After the heat exchange, the water was discharged as steam in a state of 115.0° C., 0.7 kgf/cm$^2$ g (1.67 bar), and a gas volume fraction of 0.75 and the refrigerant flow was condensed and discharged in a state of 125.0° C., 20.7 kgf/cm$^2$ g (21.3 bar), and a gas volume fraction of 0.0 and then flowed into a control valve. Here, calories condensed in the first condenser were 463422.8 W. Also, the refrigerant flow which passed through the control valve was discharged from the control valve in a state of 75.4° C., 6.2 kgf/cm$^2$ g (7.1 bar), and a gas volume fraction of 0.0 and was allowed to flow into a fluid mixer.

Meanwhile, the other part of the refrigerant flow separated in the fluid distributor was circulated to sequentially pass through a turbine, a second heat exchanger, a second condenser, a pump, the second heat exchanger, and the fluid mixer. In detail, the other part of the refrigerant flow separated in the fluid distributor was allowed to flow into the turbine at a flow rate of 31,000 kg/hr and the refrigerant flow which was discharged from the turbine and flowed into the second heat exchanger was allowed to flow into the second condenser. Also, the refrigerant flow discharged from the second condenser was allowed to flow into the pump and the refrigerant flow compressed by the pump was allowed to flow again into the second heat exchanger to be heat-exchanged with the refrigerant flow which was discharged from the turbine and flowed into the second heat exchanger and then was allowed to flow into the fluid mixer. In detail, the refrigerant flow expanded by the turbine was discharged from the turbine in a state of 63.1° C., 1.5 kgf/cm$^2$ g (2.45 bar), and a gas volume fraction of 1.0 and was allowed to flow into the second heat exchanger. In this case, an amount of work generated in the turbine was 137713.0 W. The refrigerant flow heat-exchanged with the refrigerant flow discharged from the pump in the second heat exchanger was discharged from the second heat exchanger in a state of 51.6° C., 1.5 kgf/cm$^2$ g (2.45 bar), and a gas volume fraction of 1.0 and then flowed into the second condenser and was condensed. The refrigerant flow condensed by and discharged from the second condenser in a state of 39.6° C., 1.5 kgf/cm$^2$ g (2.45 bar), and a gas volume fraction of 0.0 was allowed to flow into the pump and was compressed. The refrigerant flow which passed through the pump and was compressed was discharged from the pump in a state of 40.0° C., 6.2 kgf/cm$^2$ g (7.1 bar), and a gas volume fraction of 0.0 and then was allowed to flow into the second heat exchanger and heat-exchanged with the refrigerant flow which was discharged from the turbine and flowed into the second heat exchanger. The refrigerant flow which was discharged from the pump and flowed into the second heat exchanger to be heat-exchanged was discharged from the second heat exchanger in a state of 46.6° C., 6.2 kgf/cm$^2$ g (7.1 bar), and a gas volume fraction of 0.0 and was allowed to flow into the fluid mixer. The refrigerant flow discharged from the pump and the refrigerant flow discharged from the control valve were allowed to merge in the fluid mixer and to flow again into the evaporator at a flow rate of 50,000 kg/hr.

In this case, a coefficient of performance of the heat recovery apparatus was calculated through following Equation 8 and shown in following Table 1. The coefficient of performance indicates calories absorbed by a heat exchange medium in comparison with energy input to the compressor, that is, means a rate of recovered energy to an input energy amount. For example, when the coefficient of performance is 3, it means that calories three times of input electricity are obtained.

$$COP = \frac{Q}{W} \qquad \text{[Equation 8]}$$

In Equation 8, Q indicates calories condensed by the first condenser and W indicates a total amount of work performed by the compressor (an amount of work used by the compressor—an amount of work generated by the turbine).

Example 2

Steam was generated using a heat recovery apparatus of FIG. 7.

A refrigerant 1,1,1,3,3-pentafluoropropane (R245fa) was allowed to flow into an evaporator and to circulate to allow one part of a refrigerant flow separated from the evaporator to sequentially pass through a first heat exchanger, a compressor, a first condenser, the first heat exchanger, and a pressure-dropping device. In detail, a refrigerant flow in a state of 69.6° C., 6.2 kgf/cm$^2$ g (7.1 bar), and a gas volume fraction of 0.0 was allowed to flow into the evaporator at a flow rate of 50,000 kg/hr, and simultaneously, a waste heat flow in a state of 85.0° C., 1.0 kgf/cm$^2$ g (1.96 bar), and a gas volume fraction of 0.0 was allowed to flow into the evaporator at a flow rate of 300,000 kg/hr to be heat-exchanged. After the heat-exchange, the waste heat flow was discharged in a state of 78.2° C., 1.0 kgf/cm$^2$ g (1.96 bar), and a gas volume fraction of 0.0 at a flow rate of 300,000 kg/hr and the refrigerant flow was discharged in a state of 80.0° C., 6.2 kgf/cm$^2$ g (7.1 bar), and a gas volume fraction of 1.0 and allowed to flow into the first heat exchanger. The refrigerant flow which was discharged from the evaporator and flowed into the first heat exchanger was allowed to flow into a fluid distributor to allow one part to flow into the compressor, and the refrigerant flow discharged from the compressor was allowed to flow into the first condenser to be heat-exchanged with a fluid flow which passed through the first condenser. Also, the refrigerant flow discharged from the first condenser was allowed to flow again into the first heat exchanger to be heat-exchanged with the refrigerant flow which was discharged from the evaporator and flowed into the first heat exchanger, and then allowed to flow into a control valve. In detail, the refrigerant flow which was discharged from the evaporator and flowed into the first heat exchanger and heat-exchanged was discharged from the first heat exchanger in a state of 115.0° C., 6.2 kgf/cm$^2$ g (7.1 bar), and a gas volume fraction of 1.0 and then allowed to flow into the fluid distributor. After separating the refrigerant flow in the fluid distributor, the separated refrigerant flow was allowed to flow into the compressor at a flow rate of 19,000 kg/hr, and the refrigerant flow compressed by the compressor was discharged from the compressor in a state of 142.3° C., 20.6 kgf/cm$^2$ g (21.3 bar), and a gas volume fraction of 1.0. In this case, an amount of work used in the compressor was 151682.0 W. The refrigerant flow discharged from the compressor was allowed to flow into the first condenser, and simultaneously, water in a state of 115.0° C., 0.7 kgf/cm$^2$ g (1.67 bar), and a gas volume fraction of 0.0 was allowed to flow into the first condenser at a flow rate of 1,000 kg/hr and heat-exchanged with the refrigerant flow. After the heat exchange, the water was discharged as steam in a state of 120.0° C., 0.7 kgf/cm$^2$ g (1.67 bar), and a gas volume fraction of 1.0 and the condensed refrigerant flow was discharged in a state of 124.9.0° C., 20.6 kgf/cm$^2$ g (21.3 bar), and a gas volume fraction of 0.08 and then allowed to flow into the first heat exchanger. Here, calories condensed in the first condenser were 620779.0 W. The refrigerant flow discharged from the first condenser was heat-exchanged with the refrigerant flow discharged from the evaporator in the first heat exchanger and then discharged from the first heat exchanger in a state of 85.3° C., 20.6 kgf/cm$^2$ g (21.3 bar), and a gas volume fraction of 0.0 and then flowed into the control valve. Also, the refrigerant flow was discharged from the control valve in a state of 75.4° C., 6.2 kgf/cm$^2$ g (7.1 bar), and a gas volume fraction of 0.11 and was allowed to flow into a fluid mixer.

Meanwhile, another part of the refrigerant flow separated in the fluid distributor was circulated to sequentially pass through a turbine, a second heat exchanger, a second condenser, a pump, the second heat exchanger, and the fluid mixer. In detail, the other part of the refrigerant flow separated in the fluid distributor was allowed to flow into the turbine at a flow rate of 31,000 kg/hr and the refrigerant flow which was discharged from the turbine and flowed into the second heat exchanger was allowed to flow into the second condenser. Also, the refrigerant flow discharged from the second condenser was allowed to flow into the pump and the refrigerant flow compressed by the pump was allowed to flow again into the second heat exchanger to be heat-exchanged with the refrigerant flow which was discharged from the turbine and flowed into the second heat exchanger and then was allowed to flow into the fluid mixer. In detail, the refrigerant flow expanded by the turbine was discharged from the turbine in a state of 97.6° C., 1.5 kgf/cm$^2$ g (2.45 bar), and a gas volume fraction of 1.0 and was allowed to flow into the second heat exchanger. In this case, an amount of work generated in the turbine was 151682.0 W. The refrigerant flow which was discharged from the turbine and flowed into the second heat exchanger to be heat-exchanged with the refrigerant flow discharged from the pump was discharged from the second heat exchanger in a state of 64.5° C., 1.5 kgf/cm$^2$ g (2.45 bar), and a gas volume fraction of 1.0 and then flowed into the second condenser and was condensed. The refrigerant flow condensed by and discharged from the second condenser in a state of 39.6° C., 1.5 kgf/cm$^2$ g (2.45 bar), and a gas volume fraction of 0.0 was allowed to flow into the pump and was compressed. The refrigerant flow which passed through the pump and was compressed was discharged from the pump in a state of 40.0° C., 6.2 kgf/cm$^2$ g (7.1 bar), and a gas volume fraction of 0.0 and then was allowed to flow into the second heat exchanger and heat-exchanged with the refrigerant flow which was discharged from the turbine and flowed into the second heat exchanger. The refrigerant flow which was discharged from the pump and flowed into the second heat exchanger to be heat-exchanged was discharged from the second heat exchanger in a state of 59.5° C., 6.2 kgf/cm$^2$ g (7.1 bar), and a gas volume fraction of 0.0 and was allowed to flow into the fluid mixer. The refrigerant flow discharged from the pump and the refrigerant flow discharged from the control valve were allowed to merge in the fluid mixer and to flow again into the evaporator at a flow rate of 50,000 kg/hr.

A coefficient of performance of the heat recovery apparatus in this case was shown in Table 1.

Example 3

A refrigerant flow discharged from an evaporator was allowed to flow into a fluid distributor and separated. After separating the refrigerant flow in the fluid distributor, one part of the refrigerant flow separated in the fluid distributor was allowed to flow into a compressor at a flow rate of 25,000 kg/hr and another part of the refrigerant flow separated in the fluid distributor was allowed to flow into the turbine at a flow rate of 25,000 kg/hr. Also, water which flowed into a first condenser was allowed to flow thereinto at a flow rate of 3,000 kg/hr and the heat-exchanged water was discharged from the first condenser as steam in a state of 115.0° C., 0.7 kgf/cm$^2$ g (1.67 bar), and a gas volume fraction of 0.33. Except those described above, the steam was generated through the same method as that of Experimental Example 1.

A coefficient of performance of the heat recovery apparatus in this case was shown in Table 1.

Example 4

A refrigerant flow discharged from an evaporator was allowed to flow into a fluid distributor and separated. After separating the refrigerant flow in the fluid distributor, one part of the refrigerant flow separated in the fluid distributor was allowed to flow into a compressor at a flow rate of 40,000 kg/hr and another part of the refrigerant flow separated in the fluid distributor was allowed to flow into a turbine at a flow rate of 10,000 kg/hr. Also, water which flowed into a first condenser was allowed to flow thereinto at a flow rate of 3,000 kg/hr and the heat-exchanged water was discharged from the first condenser as steam in a state of 115.0° C., 0.7 kgf/cm$^2$ g (1.67 bar), and a gas volume fraction of 0.53. Except those described above, the steam was generated through the same method as that of Experimental Example 1.

A coefficient of performance of the heat recovery apparatus in this case was shown in Table 2.

Example 5

Steam was generated using the heat recovery apparatus of FIG. 7.

A refrigerant 1,1,1,3,3-pentafluoropropane (R245fa) was allowed to flow into an evaporator and to circulate to allow one part of a refrigerant flow separated in the evaporator to sequentially pass through a first heat exchanger, a compressor, a first condenser, the first heat exchanger, and a pressure-dropping device. In detail, a refrigerant flow in a state of 69.6° C., 6.2 kgf/cm$^2$ g (7.1 bar), and a gas volume fraction of 0.0 was allowed to flow into the evaporator at a flow rate of 50,000 kg/hr, and simultaneously, a waste heat flow in a state of 85.0° C., 1.0 kgf/cm$^2$ g (1.96 bar), and a gas volume fraction of 0.0 was allowed to flow into the evaporator at a flow rate of 300,000 kg/hr to be heat-exchanged. After the heat-exchange, the waste heat flow was discharged in a state of 78.2° C., 1.0 kgf/cm$^2$ g (1.96 bar), and a gas volume fraction of 0.0 at a flow rate of 300,000 kg/hr and the refrigerant flow was discharged in a state of 80.0° C., 6.2 kgf/cm$^2$ g (7.1 bar), and a gas volume fraction of 1.0 and allowed to flow into the first heat exchanger. The refrigerant flow which was discharged from the evaporator and flowed into the first heat exchanger was allowed to flow into a fluid distributor to allow one part to flow into the compressor, and the refrigerant flow discharged from the compressor was allowed to flow into the first condenser to be heat-exchanged with a fluid flow which passed through the first condenser. Also, the refrigerant flow discharged from the first condenser was allowed to flow again into the first heat exchanger to be heat-exchanged with the refrigerant flow which was discharged from the evaporator and flowed into the first heat exchanger, and then allowed to flow into a control valve. In detail, the refrigerant flow which was discharged from the evaporator and flowed into the first heat exchanger and heat-exchanged was discharged from the first heat exchanger in a state of 110.0° C., 6.2 kgf/cm$^2$ g (7.1 bar), and a gas volume fraction of 1.0 and then allowed to flow into the fluid distributor. After separating the refrigerant flow in the fluid distributor, the separated refrigerant flow was allowed to flow into the compressor at a flow rate of 19,000 kg/hr, and the refrigerant flow compressed by the compressor was discharged from the compressor in a state of 137.2° C., 20.7 kgf/cm$^2$ g (21.3 bar), and a gas volume fraction of 1.0. In this case, an amount of work used in the compressor was 149916.0 W. The refrigerant flow discharged from the compressor was allowed to flow into the first condenser, and simultaneously, water in a state of 115.0° C., 0.7 kgf/cm$^2$ g (1.67 bar), and a gas volume fraction of 0.0 was allowed to flow into the first condenser at a flow rate of 3,000 kg/hr and heat-exchanged with the refrigerant flow. After the heat exchange, the water was discharged as steam in a state of 115.0° C., 0.7 kgf/cm$^2$ g (1.67 bar), and a gas volume fraction of 0.34 and the condensed refrigerant flow was discharged in a state of 125.0° C., 20.7 kgf/cm$^2$ g (21.3 bar), and a gas volume fraction of 0.0 and then allowed to flow into the first heat exchanger. Here, calories condensed in the first condenser were 634524.0 W. The refrigerant flow discharged from the first condenser was heat-exchanged with the refrigerant flow discharged from the evaporator in the first heat exchanger and then discharged from the first heat exchanger in a state of 88.2° C., 20.7 kgf/cm$^2$ g (21.3 bar), and a gas volume fraction of 0.0 and then flowed into the control valve. Also, the refrigerant flow was discharged from the control valve in a state of 75.4° C., 6.2 kgf/cm$^2$ g (7.1 bar), and a gas volume fraction of 0.15 and was allowed to flow into a fluid mixer.

Meanwhile, another part of the refrigerant flow separated in the fluid distributor was circulated to sequentially pass through a turbine, a second heat exchanger, a second condenser, a pump, the second heat exchanger, and the fluid mixer. In detail, the other part of the refrigerant flow separated in the fluid distributor was allowed to flow into the turbine at a flow rate of 31,000 kg/hr and the refrigerant flow which was discharged from the turbine and flowed into the second heat exchanger was allowed to flow into the second condenser. Also, the refrigerant flow discharged from the second condenser was allowed to flow into the pump and the refrigerant flow compressed by the pump was allowed to flow again into the second heat exchanger to be heat exchanged with the refrigerant flow which was discharged from the turbine and flowed into the second heat exchanger and then was allowed to flow into the fluid mixer. In detail, the refrigerant flow expanded by the turbine was discharged from the turbine in a state of 92.6° C., 1.5 kgf/cm$^2$ g (2.45 bar), and a gas volume fraction of 1.0 and was allowed to flow into the second heat exchanger. In this case, an amount of work generated in the turbine was 149916.0 W. The refrigerant flow which was discharged from the turbine and flowed into the second heat exchanger to be heat-exchanged with the refrigerant flow discharged from the pump was discharged from the second heat exchanger in a state of 62.6° C., 1.5 kgf/cm$^2$ g (2.45 bar), and a gas volume fraction of 1.0 and then flowed into the second condenser and was condensed. The refrigerant flow condensed by and discharged from the second condenser in a state of 39.6° C., 1.5 kgf/cm$^2$ g (2.45 bar), and a gas volume fraction of 0.0 was allowed to flow into the pump and was compressed. The refrigerant flow which passed through the pump and was compressed was discharged from the pump in a state of 40.0° C., 6.2 kgf/cm$^2$ g (7.1 bar), and a gas volume fraction of 0.0 and then was allowed to flow into the second heat exchanger to be heat-exchanged with the refrigerant flow which was discharged from the turbine and flowed into the second heat exchanger. The refrigerant flow which was discharged from the pump and flowed into the second heat exchanger to be heat-exchanged was discharged from the second heat exchanger in a state of 57.6° C., 6.2 kgf/cm$^2$ g (7.1 bar), and a gas volume fraction of 0.0 and was allowed to flow into the fluid mixer. The refrigerant flow discharged from the pump and the refrigerant flow discharged from the control valve were allowed to merge in the fluid mixer and to flow again into the evaporator at a flow rate of 50,000 kg/hr.

A coefficient of performance of the heat recovery apparatus in this case was shown in Table 2.

Example 6

Steam was generated using the heat recovery apparatus of FIG. 7.

A refrigerant 1,1,1,3,3-pentafluoropropane (R245fa) was allowed to flow into an evaporator and to circulate to allow one part of a refrigerant flow separated in the evaporator to sequentially pass through a first heat exchanger, a compressor, a first condenser, the first heat exchanger, and a pressure-dropping device. In detail, a refrigerant flow in a state of 69.6° C., 6.2 kgf/cm$^2$ g (7.1 bar), and a gas volume fraction of 0.0 was allowed to flow into the evaporator at a flow rate of 50,000 kg/hr, and simultaneously, a waste heat flow in a state of 85.0° C., 1.0 kgf/cm$^2$ g (1.96 bar), and a gas volume fraction of 0.0 was allowed to flow into the evaporator at a flow rate of 300,000 kg/hr to be heat-exchanged. After the heat-exchange, the waste heat flow was discharged in a state of 78.2° C., 1.0 kgf/cm$^2$ g (1.96 bar), and a gas volume fraction of 0.0 at a flow rate of 300,000 kg/hr and the refrigerant flow was discharged in a state of 80.0° C., 6.2 kgf/cm$^2$ g (7.1 bar), and a gas volume fraction of 1.0 and allowed to flow into the first heat exchanger. The refrigerant flow which was discharged from the evaporator and flowed into the first heat exchanger was allowed to flow into a fluid distributor to allow one part thereof to flow into the compressor, and the refrigerant flow discharged from the compressor was allowed to flow into the first condenser to be heat-exchanged with a fluid flow which passed through the first condenser. Also, the refrigerant flow discharged from the first condenser was allowed to flow again into the first heat exchanger to be heat-exchanged with the refrigerant flow which was discharged from the evaporator and flowed into the first heat exchanger, and then allowed to flow into a control valve. In detail, the refrigerant flow which was discharged from the evaporator and flowed into the first heat exchanger and heat-exchanged was discharged from the first heat exchanger in a state of 90.0° C., 6.2 kgf/cm$^2$ g (7.1 bar), and a gas volume fraction of 1.0 and then allowed to flow into the fluid distributor. After separating the refrigerant flow in the fluid distributor, the separated refrigerant flow was allowed to flow into the compressor at a flow rate of 19,000 kg/hr, and the refrigerant flow compressed by the compressor was discharged from the compressor in a state of 125.0° C., 20.7 kgf/cm$^2$ g (21.3 bar), and a gas volume fraction of 0.92. In this case, an amount of work used in the compressor was 141596.0 W. The refrigerant flow discharged from the compressor was allowed to flow into the first condenser, and simultaneously, water in a state of 115.0° C., 0.7 kgf/cm$^2$ g (1.67 bar), and a gas volume fraction of 0.0 was allowed to flow into the first condenser at a flow rate of 3,000 kg/hr and heat-exchanged with the refrigerant flow. After the heat exchange, the water was discharged as steam in a state of 115.0° C., 0.7 kgf/cm$^2$ g (1.67 bar), and a gas volume fraction of 0.28 and the condensed refrigerant flow was discharged in a state of 125.0° C., 20.7 kgf/cm$^2$ g (21.3 bar), and a gas volume fraction of 0.0 and then allowed to flow into the first heat exchanger. Here, calories condensed in the first condenser were 520590.8 W. The refrigerant flow discharged from the first condenser was heat-exchanged with the refrigerant flow discharged from the evaporator in the first heat exchanger and then discharged from the first heat exchanger in a state of 114.0° C., 20.7 kgf/cm$^2$ g (21.3 bar), and a gas volume fraction of 0.0 and then flowed into the control valve. Also, the refrigerant flow was discharged from the control valve in a state of 75.4° C., 6.2 kgf/cm$^2$ g (7.1 bar), and a gas volume fraction of 0.0 and was allowed to flow into a fluid mixer.

Meanwhile, another part of the refrigerant flow separated in the fluid distributor was circulated to sequentially pass through a turbine, a second heat exchanger, a second condenser, a pump, the second heat exchanger, and the fluid mixer. In detail, the other part of the refrigerant flow separated in the fluid distributor was allowed to flow into the turbine at a flow rate of 31,000 kg/hr and the refrigerant flow which was discharged from the turbine and flowed into the second heat exchanger was allowed to flow into the second condenser. Also, the refrigerant flow discharged from the second condenser was allowed to flow into the pump and the refrigerant flow compressed by the pump was allowed to flow again into the second heat exchanger to be heat exchanged with the refrigerant flow which was discharged from the turbine and flowed into the second heat exchanger and then was allowed to flow into the fluid mixer. In detail, the refrigerant flow expanded by the turbine was discharged from the turbine in a state of 72.9° C., 1.5 kgf/cm$^2$ g (2.45 bar), and a gas volume fraction of 1.0 and was allowed to flow into the second heat exchanger. In this case, an amount of work generated in the turbine was 141686.0 W.

The refrigerant flow which was discharged from the turbine and flowed into the second heat exchanger to be heat-exchanged with the refrigerant flow discharged from the pump was discharged from the second heat exchanger in a state of 55.2° C., 1.5 kgf/cm$^2$ g (2.45 bar), and a gas volume fraction of 1.0 and then flowed into the second condenser and was condensed. The refrigerant flow condensed by and discharged from the second condenser in a state of 39.6° C., 1.5 kgf/cm$^2$ g (2.45 bar), and a gas volume fraction of 0.0 was allowed to flow into the pump and was compressed. The refrigerant flow which passed through the pump and was compressed was discharged from the pump in a state of 40.0° C., 6.2 kgf/cm$^2$ g (7.1 bar), and a gas volume fraction of 0.0 and then was allowed to flow into the second heat exchanger to be heat-exchanged with the refrigerant flow which was discharged from the turbine and flowed into the second heat exchanger. The refrigerant flow which was discharged from the pump and flowed into the second heat exchanger to be heat-exchanged was discharged from the second heat exchanger in a state of 50.2° C., 6.2 kgf/cm² g (7.1 bar), and a gas volume fraction of 0.0 and was allowed to flow into the fluid mixer. The refrigerant flow discharged from the pump and the refrigerant flow discharged from the control valve were allowed to merge in the fluid mixer and to flow again into the evaporator at a flow rate of 50,000 kg/hr.

A coefficient of performance of the heat recovery apparatus in this case was shown in Table 2.

Example 7

Steam was generated using the heat recovery apparatus of FIG. 7.

A refrigerant 1,1,1,3,3-pentafluoropropane (R245fa) was allowed to flow into an evaporator and to circulate to allow one part of a refrigerant flow separated in the evaporator to sequentially pass through a first heat exchanger, a compressor, a first condenser, the first heat exchanger, and a pressure-dropping device. In detail, a refrigerant flow in a state of 69.6° C., 6.2 kgf/cm² g (7.1 bar), and a gas volume fraction of 0.0 was allowed to flow into the evaporator at a flow rate of 50,000 kg/hr, and simultaneously, a waste heat flow in a state of 85.0° C., 1.0 kgf/cm² g (1.96 bar), and a gas volume fraction of 0.0 was allowed to flow into the evaporator at a flow rate of 300,000 kg/hr to be heat-exchanged. After the heat-exchange, the waste heat flow was discharged in a state of 78.4° C., 1.0 kgf/cm² g (1.96 bar), and a gas volume fraction of 0.0 at a flow rate of 300,000 kg/hr and the refrigerant flow was discharged in a state of 77.0° C., 6.2 kgf/cm² g (7.1 bar), and a gas volume fraction of 1.0 and allowed to flow into the first heat exchanger. The refrigerant flow which was discharged from the evaporator and flowed into the first heat exchanger was allowed to flow into a fluid distributor to allow one part thereof to flow into the compressor, and the refrigerant flow discharged from the compressor was allowed to flow into the first condenser to be heat-exchanged with a fluid flow which passed through the first condenser. Also, the refrigerant flow discharged from the first condenser was allowed to flow again into the first heat exchanger to be heat-exchanged with the refrigerant flow which was discharged from the evaporator and flowed into the first heat exchanger, and then allowed to flow into a control valve. In detail, the refrigerant flow which was discharged from the evaporator and flowed into the first heat exchanger and heat-exchanged was discharged from the first heat exchanger in a state of 108.2° C., 6.2 kgf/cm² g (7.1 bar), and a gas volume fraction of 1.0 and then allowed to flow into the fluid distributor. After separating the refrigerant flow in the fluid distributor, the separated refrigerant flow was allowed to flow into the compressor at a flow rate of 19,000 kg/hr, and the refrigerant flow compressed by the compressor was discharged from the compressor in a state of 135.4° C., 20.7 kgf/cm² g (21.3 bar), and a gas volume fraction of 1.0. In this case, an amount of work used in the compressor was 149260.0 W. The refrigerant flow discharged from the compressor was allowed to flow into the first condenser, and simultaneously, water in a state of 115.0° C., 0.7 kgf/cm² g (1.67 bar), and a gas volume fraction of 0.0 was allowed to flow into the first condenser at a flow rate of 1,000 kg/hr and heat-exchanged with the refrigerant flow. After the heat exchange, the water was discharged as steam in a state of 120.0° C., 0.7 kgf/cm² g (1.67 bar), and a gas volume fraction of 1.0 and the condensed refrigerant flow was discharged in a state of 125.0° C., 20.7 kgf/cm² g (21.3 bar), and a gas volume fraction of 0.01 and then allowed to flow into the first heat exchanger. Here, calories condensed in the first condenser were 620779.0 W. The refrigerant flow discharged from the first condenser was heat-exchanged with the refrigerant flow discharged from the evaporator in the first heat exchanger and then discharged from the first heat exchanger in a state of 87.0° C., 20.7 kgf/cm² g (21.3 bar), and a gas volume fraction of 0.0 and then flowed into the control valve. Also, the refrigerant flow was discharged from the control valve in a state of 75.4° C., 6.2 kgf/cm² g (7.1 bar), and a gas volume fraction of 0.0 and was allowed to flow into a fluid mixer.

Meanwhile, another part of the refrigerant flow separated in the fluid distributor was circulated to sequentially pass through a turbine, a second heat exchanger, a second condenser, a pump, the second heat exchanger, and the fluid mixer. In detail, the other part of the refrigerant flow separated in the fluid distributor was allowed to flow into the turbine at a flow rate of 31,000 kg/hr and the refrigerant flow which was discharged from the turbine and flowed into the second heat exchanger was allowed to flow into the second condenser. Also, the refrigerant flow discharged from the second condenser was allowed to flow into the pump and the refrigerant flow compressed by the pump was allowed to flow again into the second heat exchanger to be heat-exchanged with the refrigerant flow which was discharged from the turbine and flowed into the second heat exchanger and then was allowed to flow into the fluid mixer. In detail, the refrigerant flow expanded by the turbine was discharged from the turbine in a state of 90.9° C., 1.5 kgf/cm² g (2.45 bar), and a gas volume fraction of 1.0 and was allowed to flow into the second heat exchanger. In this case, an amount of work generated in the turbine was 148985.0 W. The refrigerant flow which was discharged from the turbine and flowed into the second heat exchanger to be heat-exchanged with the refrigerant flow discharged from the pump was discharged from the second heat exchanger in a state of 62.0° C., 1.5 kgf/cm² g (2.45 bar), and a gas volume fraction of 1.0 and then flowed into the second condenser and was condensed. The refrigerant flow condensed by and discharged from the second condenser in a state of 39.6° C., 1.5 kgf/cm² g (2.45 bar), and a gas volume fraction of 0.0 was allowed to flow into the pump and was compressed. The refrigerant flow which passed through the pump and was compressed was discharged from the pump in a state of 40.0° C., 6.2 kgf/cm² g (7.1 bar), and a gas volume fraction of 0.0 and then was allowed to flow into the second heat exchanger to be heat-exchanged with the refrigerant flow which was discharged from the turbine and flowed into the second heat exchanger. The refrigerant flow which was discharged from the pump and flowed into the second heat exchanger to be heat-exchanged was discharged from the second heat exchanger in a state of 57.0° C., 6.2 kgf/cm² g (7.1 bar), and a gas volume fraction of 0.0 and was allowed to flow into the fluid mixer. The refrigerant flow discharged from the pump and the refrigerant flow discharged from the control valve were allowed to merge in the fluid mixer and to flow again into the evaporator at a flow rate of 50,000 kg/hr.

A coefficient of performance of the heat recovery apparatus in this case was shown in Table 3.

Example 8

Steam was generated using the heat recovery apparatus of FIG. 7.

A refrigerant 1,1,1,3,3-pentafluoropropane (R245fa) was allowed to flow into an evaporator and to circulate to allow one part of a refrigerant flow separated in the evaporator to sequentially pass through a first heat exchanger, a compressor, a first condenser, the first heat exchanger, and a pressure-dropping device. In detail, a refrigerant flow in a state of 69.6° C., 6.2 kgf/cm$^2$ g (7.1 bar), and a gas volume fraction of 0.0 was allowed to flow into the evaporator at a flow rate of 50,000 kg/hr, and simultaneously, a waste heat flow in a state of 85.0° C., 1.0 kgf/cm$^2$ g (1.96 bar), and a gas volume fraction of 0.0 was allowed to flow into the evaporator at a flow rate of 300,000 kg/hr to be heat-exchanged. After the heat-exchange, the waste heat flow was discharged in a state of 78.2° C., 1.0 kgf/cm$^2$ g (1.96 bar), and a gas volume fraction of 0.0 at a flow rate of 300,000 kg/hr and the refrigerant flow was discharged in a state of 80.0° C., 6.2 kgf/cm$^2$ g (7.1 bar), and a gas volume fraction of 1.0 and allowed to flow into the first heat exchanger. The refrigerant flow which was discharged from the evaporator and flowed into the first heat exchanger was allowed to flow into a fluid distributor to allow one part thereof to flow into the compressor, and the refrigerant flow discharged from the compressor was allowed to flow into the first condenser to be heat-exchanged with a fluid flow which passed through the first condenser. Also, the refrigerant flow discharged from the first condenser was allowed to flow again into the first heat exchanger to be heat-exchanged with the refrigerant flow which was discharged from the evaporator and flowed into the first heat exchanger, and then allowed to flow into a control valve. In detail, the refrigerant flow which was discharged from the evaporator and flowed into the first heat exchanger and heat-exchanged was discharged from the first heat exchanger in a state of 127.7° C., 6.2 kgf/cm$^2$ g (7.1 bar), and a gas volume fraction of 1.0 and then allowed to flow into the fluid distributor. After separating the refrigerant flow in the fluid distributor, the separated refrigerant flow was allowed to flow into the compressor at a flow rate of 19,000 kg/hr, and the refrigerant flow compressed by the compressor was discharged from the compressor in a state of 163.9° C., 29.3 kgf/cm$^2$ g (29.7 bar), and a gas volume fraction of 1.0. In this case, an amount of work used in the compressor was 206685.2 W. The refrigerant flow discharged from the compressor was allowed to flow into the first condenser, and simultaneously, water in a state of 137.0° C., 2.3 kgf/cm$^2$ g (3.24 bar), and a gas volume fraction of 0.0 was allowed to flow into the first condenser at a flow rate of 3,000 kg/hr and heat-exchanged with the refrigerant flow. After the heat exchange, the water was discharged as steam in a state of 137.0° C., 2.3 kgf/cm$^2$ g (3.24 bar), and a gas volume fraction of 0.29 and the condensed refrigerant flow was discharged in a state of 142.9° C., 29.3 kgf/cm$^2$ g (29.7 bar), and a gas volume fraction of 0.0 and then allowed to flow into the first heat exchanger. Here, calories condensed in the first condenser were 515418.0 W. The refrigerant flow discharged from the first condenser was heat-exchanged with the refrigerant flow discharged from the evaporator in the first heat exchanger and then discharged from the first heat exchanger in a state of 90.0° C., 29.3 kgf/cm$^2$ g (29.7 bar), and a gas volume fraction of 0.0 and then flowed into the control valve. Also, the refrigerant flow was discharged from the control valve in a state of 75.4° C., 6.2 kgf/cm$^2$ g (7.1 bar), and a gas volume fraction of 0.0 and was allowed to flow into a fluid mixer.

Meanwhile, another part of the refrigerant flow separated in the fluid distributor was circulated to sequentially pass through a turbine, a second heat exchanger, a second condenser, a pump, the second heat exchanger, and the fluid mixer. In detail, the other part of the refrigerant flow separated in the fluid distributor was allowed to flow into the turbine at a flow rate of 31,000 kg/hr and the refrigerant flow which was discharged from the turbine and flowed into the second heat exchanger was allowed to flow into the second condenser. Also, the refrigerant flow discharged from the second condenser was allowed to flow into the pump, and the refrigerant flow compressed by the pump was allowed to flow again into the second heat exchanger to be heat-exchanged with the refrigerant flow which was discharged from the turbine and flowed into the second heat exchanger and then was allowed to flow into the fluid mixer. In detail, the refrigerant flow expanded by the turbine was discharged from the turbine in a state of 110.1° C., 1.5 kgf/cm$^2$ g (2.45 bar), and a gas volume fraction of 1.0 and was allowed to flow into the second heat exchanger. In this case, an amount of work generated in the turbine was 156742.0 W. The refrigerant flow which was discharged from the turbine and flowed into the second heat exchanger to be heat-exchanged with the refrigerant flow discharged from the pump was discharged from the second heat exchanger in a state of 69.3° C., 1.5 kgf/cm$^2$ g (2.45 bar), and a gas volume fraction of 1.0 and then flowed into the second condenser and was condensed. The refrigerant flow condensed by and discharged from the second condenser in a state of 39.6° C., 1.5 kgf/cm$^2$ g (2.45 bar), and a gas volume fraction of 0.0 was allowed to flow into the pump and was compressed. The refrigerant flow which passed through the pump and was compressed was discharged from the pump in a state of 40.0° C., 6.2 kgf/cm$^2$ g (7.1 bar), and a gas volume fraction of 0.0 and then was allowed to flow into the second heat exchanger to be heat-exchanged with the refrigerant flow which was discharged from the turbine and flowed into the second heat exchanger. The refrigerant flow which was discharged from the pump and flowed into the second heat exchanger to be heat-exchanged was discharged from the second heat exchanger in a state of 64.3° C., 6.2 kgf/cm$^2$ g (7.1 bar), and a gas volume fraction of 0.0 and was allowed to flow into the fluid mixer. The refrigerant flow discharged from the pump and the refrigerant flow discharged from the control valve were allowed to merge in the fluid mixer and to flow again into the evaporator at a flow rate of 50,000 kg/hr.

A coefficient of performance of the heat recovery apparatus in this case was shown in Table 3.

Comparative Example 1

Steam was generated using the same method as that of Experimental Example 1 except that the whole refrigerant flow discharged from an evaporator was allowed to flow into a compressor without flowing into a fluid distributor.

In detail, a refrigerant flow in a state of 75.4° C., 7.1 kgf/cm$^2$ g, and a gas volume fraction of 0.0 was allowed to flow into the evaporator, and simultaneously, a waste heat flow in a state of 85.0° C., 1.0 kgf/cm$^2$ g, and a gas volume fraction of 0.0 was allowed to flow into the evaporator at a flow rate of 300,000 kg/hr to be heat-exchanged. After the heat-exchange, the waste heat flow was discharged in a state of 81.2° C., 1.0 kgf/cm$^2$ g, and a gas volume fraction of 0.0 at a flow rate of 300,000 kg/hr and the refrigerant flow was discharged in a state of 80.0° C., 7.1 kgf/cm$^2$ g, and a gas volume fraction of 1.0 and flowed into a compressor. Also, the refrigerant flow compressed by the compressor was discharged from the compressor in a state of 125.0° C., 21.3 kgf/cm$^2$ g, and a gas volume fraction of 0.82. In this case, an amount of work used in the compressor was 214078.6 W.

The refrigerant flow discharged from the compressor was allowed to flow into the first condenser, and simultaneously, water in a state of 115.0° C., 0.7 kgf/cm² g, and a gas volume fraction of 0.0 was allowed to flow into the first condenser at a flow rate of 1,800 kg/hr and heat-exchanged with the refrigerant flow. After the heat exchange, the water was discharged as steam in a state of 120.0° C., 0.7 kgf/cm² g, and a gas volume fraction of 1.0 and the refrigerant flow was condensed and discharged in a state of 120.0° C., 21.3 kgf/cm² g, and a gas volume fraction of 0.0 and then flowed into a control valve. Also, the refrigerant flow which passed through the control valve was discharged from the control valve in a state of 75.4° C., 7.1 kgf/cm² g, and a gas volume fraction of 0.0 and was allowed to flow again into the evaporator.

A coefficient of performance of the heat recovery apparatus in this case was calculated and shown in Table 4.

Comparative Example 2

Steam was generated using the heat recovery apparatus of FIG. 7.

A refrigerant 1,1,1,3,3-pentafluoropropane (R245fa) was allowed to flow into an evaporator and to circulate to allow one part of a refrigerant flow separated in the evaporator to sequentially pass through a first heat exchanger, a compressor, a first condenser, the first heat exchanger, and a pressure-dropping device. In detail, a refrigerant flow in a state of 47.1° C., 2.2 kgf/cm² g (3.14 bar), and a gas volume fraction of 0.34 was allowed to flow into the evaporator at a flow rate of 50,000 kg/hr, and simultaneously, a waste heat flow in a state of 85.0° C., 1.0 kgf/cm² g (1.96 bar), and a gas volume fraction of 0.0 was allowed to flow into the evaporator at a flow rate of 300,000 kg/hr to be heat-exchanged. After the heat-exchange, the waste heat flow was discharged in a state of 83.8° C., 1.0 kgf/cm² g (1.96 bar), and a gas volume fraction of 0.0 at a flow rate of 300,000 kg/hr and the refrigerant flow was discharged in a state of 80.0° C., 2.2 kgf/cm² g (3.14 bar), and a gas volume fraction of 1.0 and allowed to flow into the first heat exchanger. The refrigerant flow which was discharged from the evaporator and flowed into the first heat exchanger was allowed to flow into a fluid distributor to allow one part thereof to flow into the compressor, and the refrigerant flow discharged from the compressor was allowed to flow into the first condenser to be heat-exchanged with a fluid flow which passed through the first condenser. Also, the refrigerant flow discharged from the first condenser was allowed to flow again into the first heat exchanger to be heat-exchanged with the refrigerant flow which was discharged from the evaporator and flowed into the first heat exchanger, and then allowed to flow into a control valve. In detail, the refrigerant flow which was discharged from the evaporator and flowed into the first heat exchanger and heat-exchanged was discharged from the first heat exchanger in a state of 101.8° C., 2.2 kgf/cm² g (3.14 bar), and a gas volume fraction of 1.0 and then allowed to flow into the fluid distributor. After separating the refrigerant flow in the fluid distributor, the separated refrigerant flow was allowed to flow into the compressor at a flow rate of 19,000 kg/hr, and the refrigerant flow compressed by the compressor was discharged from the compressor in a state of 149.1° C., 20.7 kgf/cm² g (21.3 bar), and a gas volume fraction of 1.0. In this case, an amount of work used in the compressor was 260853.5 W. The refrigerant flow discharged from the compressor was allowed to flow into the first condenser, and simultaneously, water in a state of 115.0° C., 0.7 kgf/cm² g (1.67 bar), and a gas volume fraction of 0.0 was allowed to flow into the first condenser at a flow rate of 1,000 kg/hr and heat-exchanged with the refrigerant flow. After the heat exchange, the water was discharged as steam in a state of 120.0° C., 0.7 kgf/cm² g (1.67 bar), and a gas volume fraction of 1.0 and the condensed refrigerant flow was discharged in a state of 125.0° C., 20.7 kgf/cm² g (21.3 bar), and a gas volume fraction of 0.14 and then allowed to flow into the first heat exchanger. Here, calories condensed in the first condenser were 620778.6 W. The refrigerant flow discharged from the first condenser was heat-exchanged with the refrigerant flow discharged from the evaporator in the first heat exchanger and then discharged from the first heat exchanger in a state of 106.8° C., 20.7 kgf/cm² g (21.3 bar), and a gas volume fraction of 0.0 and then flowed into the control valve. Also, the refrigerant flow was discharged from the control valve in a state of 47.1° C., 2.2 kgf/cm² g (3.14 bar), and a gas volume fraction of 0.60 and was allowed to flow into a fluid mixer.

Meanwhile, another part of the refrigerant flow separated in the fluid distributor was circulated to sequentially pass through a turbine, a second heat exchanger, a second condenser, a pump, the second heat exchanger, and the fluid mixer. In detail, the other part of the refrigerant flow separated in the fluid distributor was allowed to flow into the turbine at a flow rate of 31,000 kg/hr and the refrigerant flow which was discharged from the turbine and flowed into the second heat exchanger was allowed to flow into the second condenser. Also, the refrigerant flow discharged from the second condenser was allowed to flow into the pump and the refrigerant flow compressed by the pump was allowed to flow again into the second heat exchanger to be heat exchanged with the refrigerant flow which was discharged from the turbine and flowed into the second heat exchanger and then was allowed to flow into the fluid mixer. In detail, the refrigerant flow expanded by the turbine was discharged from the turbine in a state of 97.8° C., 1.5 kgf/cm² g (2.45 bar), and a gas volume fraction of 1.0 and was allowed to flow into the second heat exchanger. In this case, an amount of work generated in the turbine was 34916.2 W. The refrigerant flow which was discharged from the turbine and flowed into the second heat exchanger and heat-exchanged with the refrigerant flow discharged from the pump was discharged from the second heat exchanger in a state of 52.1° C., 1.5 kgf/cm² g (2.45 bar), and a gas volume fraction of 1.0 and then flowed into the second condenser and was condensed. The refrigerant flow condensed by and discharged from the second condenser in a state of 39.6° C., 1.5 kgf/cm² g (2.45 bar), and a gas volume fraction of 0.0 was allowed to flow into the pump and was compressed. The refrigerant flow which passed through the pump and was compressed was discharged from the pump in a state of 39.6° C., 2.2 kgf/cm² g (3.14 bar), and a gas volume fraction of 0.0 and then was allowed to flow into the second heat exchanger and heat-exchanged with the refrigerant flow which was discharged from the turbine and flowed into the second heat exchanger. The refrigerant flow which was discharged from the pump and flowed into the second heat exchanger to be heat-exchanged was discharged from the second heat exchanger in a state of 47.1° C., 2.2 kgf/cm² g (3.14 bar), and a gas volume fraction of 0.17 and was allowed to flow into the fluid mixer. The refrigerant flow discharged from the pump and the refrigerant flow discharged from the control valve were allowed to merge in the fluid mixer and to flow again into the evaporator at a flow rate of 50,000 kg/hr.

A coefficient of performance of the heat recovery apparatus in this case was shown in Table 4.

TABLE 1

|  | Example 1 | | Example 2 | | Example 3 | |
|---|---|---|---|---|---|---|
| $F_c/F_e$ |  | 0.38 |  | 0.38 |  | 0.5 |
| $F_t/F_e$ |  | 0.62 |  | 0.62 |  | 0.5 |
| $T_{Ein}$ (° C.)  $T_{Eout}$ (° C.) | 85 | 80 | 85 | 80 | 85 | 80 |
| $T_{Ein} - T_{Eout}$ (° C.) |  | 5 |  | 5 |  | 5 |
| $P_{C1in}$ (bar)  $P_{C1out}$ (bar) | 7.1 | 21.3 | 7.1 | 21.3 | 7.1 | 21.3 |
| $P_{C1out}/P_{C1in}$ |  | 3 |  | 3 |  | 3 |
| $P_{C2in}$ (bar)  $P_{C2in}$ (bar) | 2.45 | 7.1 | 2.45 | 7.1 | 2.45 | 7.1 |
| $P_{C2out}/P_{C2in}$ |  | 2.9 |  | 2.9 |  | 2.9 |
| $T_{R1in}$ (° C.)  $T_{R1out}$ (° C.) | n/a | n/a | 124.9 | 115 | n/a | n/a |
| $T_{R1in} - T_{R1out}$ (° C.) |  | n/a |  | 9.9 |  | n/a |
| Q (W) |  | 463,422.8 |  | 620,779.0 |  | 609,766.8 |
| Total W (W) |  | 0 |  | 0 |  | 67,340 |
| COP |  | ∞ |  | ∞ |  | 9 | n/a: not available

TABLE 2

|  | Example 4 | | Example 5 | | Example 6 | |
|---|---|---|---|---|---|---|
| $F_c/F_e$ |  | 0.8 |  | 0.38 |  | 0.38 |
| $F_t/F_e$ |  | 0.2 |  | 0.62 |  | 0.62 |
| $T_{Ein}$ (° C.)  $T_{Eout}$ (° C.) | 85 | 80 | 85 | 80 | 85 | 80 |
| $T_{Ein} - T_{Eout}$ (° C.) |  | 5 |  | 5 |  | 5 |
| $P_{C1in}$ (bar)  $P_{C1out}$ (bar) | 7.1 | 21.3 | 7.1 | 21.3 | 7.1 | 21.3 |
| $P_{C1out}/P_{C1in}$ |  | 3 |  | 3 |  | 3 |
| $P_{C2in}$ (bar)  $P_{C2in}$ (bar) | 2.45 | 7.1 | 2.45 | 7.1 | 2.45 | 7.1 |
| $P_{C2out}/P_{C2in}$ |  | 2.9 |  | 2.9 |  | 2.9 |
| $T_{R1in}$  $T_{R1out}$ (° C.) (° C.) | n/a | n/a | 125 | 110 | 125 | 90 |
| $T_{R1in} - T_{R1out}$ (° C.) |  | n/a |  | 15 |  | 35 |
| Q (W) |  | 975,626.9 |  | 634,524.0 |  | 520,590.8 |
| Total W (W) |  | 241,014.5 |  | 0 |  | 0 |
| COP |  | 4.05 |  | ∞ |  | ∞ |

TABLE 3

|  | Example 7 | | Example 8 | |
|---|---|---|---|---|
| $F_c/F_e$ |  | 0.38 |  | 0.38 |
| $F_t/F_e$ |  | 0.62 |  | 0.62 |
| $T_{Ein}$(° C.)  $T_{Eout}$(° C.) | 85 | 77 | 85 | 80 |
| $T_{Ein} - T_{Eout}$(° C.) |  | 8 |  | 5 |
| $P_{C1in}$(bar)  $P_{C1out}$(bar) | 7.1 | 21.3 | 7.1 | 29.7 |
| $P_{C1out}/P_{C1in}$ |  | 3 |  | 4.2 |
| $P_{C2in}$(bar)  $P_{C2in}$(bar) | 2.45 | 7.1 | 2.45 | 7.1 |
| $P_{C2out}/P_{C2in}$ |  | 2.9 |  | 2.9 |
| $T_{R1in}$(° C.)  $T_{R1out}$(° C.) | 125 | 108.2 | 142.9 | 127.7 |
| $T_{R1in} - T_{R1out}$(° C.) |  | 16.8 |  | 15.2 |
| Q(W) |  | 620,779.0 |  | 515,418.0 |
| Total W(W) |  | 275.0 |  | 49,943.2 |
| COP |  | 2257.4 |  | 10.32 |

TABLE 4

|  | Comparative Example 1 | | Comparative Example 2 | |
|---|---|---|---|---|
| $F_c/F_e$ |  | 1 |  | 0.38 |
| $F_t/F_e$ |  | 0 |  | 0.62 |
| $T_{Ein}$(° C.)  $T_{Eout}$(° C.) | 85 | 80 | 85 | 80 |
| $T_{Ein} - T_{Eout}$(° C.) |  | 5 |  | 5 |
| $P_{C1in}$(bar)  $P_{C1out}$(bar) | 7.1 | 21.3 | 3.14 | 21.3 |
| $P_{C1out}/P_{C1in}$ |  | 3 |  | 6.78 |
| $P_{C2in}$(bar)  $P_{C2in}$(bar) | n/a | n/a | 2.45 | 3.14 |
| $P_{C2out}/P_{C2in}$ |  | n/a |  | 1.28 |

TABLE 4-continued

|  | Comparative Example 1 | | Comparative Example 2 | |
|---|---|---|---|---|
| $T_{R1in}$(° C.)  $T_{R1out}$(° C.) | n/a | n/a | 125 | 101.8 |
| $T_{R1in} - T_{R1out}$(° C.) |  | n/a |  | 23.2 |
| Q(W) |  | 830,573.0 |  | 620,778.6 |
| Total W(W) |  | 214,078.6 |  | 225,937.3 |
| COP |  | 3.88 |  | 2.75 | n/a: not available

The invention claimed is:

1. A heat recovery apparatus comprising:
a first circulation loop which comprises an evaporator, a first compressor, a first condenser, and a control valve or a first turbine, fluidically connected through pipes through which a refrigerant flows; and
a second circulation loop which shares the evaporator with the first circulation loop and comprises the evaporator, a second turbine, a second condenser, and a second compressor, fluidically connected through pipes through which the refrigerant flows,
wherein a refrigerant flow discharged from the evaporator flows into a fluid distributor,
wherein the refrigerant flow which flows into the fluid distributor is separated in the fluid distributor in such a way that one part of the refrigerant flow flows into the first compressor and another part flows into the second turbine,
wherein a refrigerant flow discharged from the first compressor flows into the first condenser and heat-exchanged with a second fluid flow which flows into the first condenser,
wherein the refrigerant flow discharged from the first condenser flows into the control valve or the first turbine of the first circulation loop,
wherein the refrigerant flow discharged from the second turbine flows into the second condenser,
wherein the refrigerant flow discharged from the second condenser flows into the second compressor,
wherein the refrigerant flow discharged from the control valve or the first turbine of the first circulation loop and the refrigerant flow discharged from the second compressor flow into a fluid mixer and merge thereinto and then flow into the evaporator, and
wherein the refrigerant flow which flows into the evaporator is heat-exchanged with a first fluid flow which flows into the evaporator,
wherein the heat recovery apparatus further comprises:
a first heat exchanger fluidically connected to a pipe between the evaporator and the fluid distributor and a pipe between the first condenser and the control valve or the first turbine of the first circulation loop,
wherein the refrigerant flow discharged from the evaporator flows into the first heat exchanger and then flows into the fluid distributor,
wherein the refrigerant flow discharged from the first condenser flows into the first heat exchanger and then flows into the control valve or the first turbine of the first circulation loop,
wherein the refrigerant flow discharged from the evaporator and the refrigerant flow discharged from the first condenser are heat-exchanged in the first heat exchanger,
a second heat exchanger fluidically connected to a pipe between the turbine and the second condenser and a pipe between the second compressor and the fluid mixer, wherein the refrigerant flow discharged from the second turbine flows into the second heat exchanger and then flows into the second condenser, wherein the refrigerant flow discharged from the second compressor flows into the second heat exchanger and then flows into the fluid mixer, and wherein the refrigerant flow discharged from the second turbine and the refrigerant flow discharged from the second compressor are heat-exchanged in the second heat exchanger, wherein a ratio of a flow rate of the refrigerant flow which is separated in the fluid distributor and flows into the first compressor to an entire flow rate of the refrigerant flow discharged from the evaporator satisfies following Equation 1:

$$0.3 \leq F_c/F_e \leq 0.5 \qquad \text{Equation 1}$$

wherein $F_c$ is the flow rate of the refrigerant flow which is separated in the fluid distributor and flows into the first compressor and $F_e$ is the entire flow rate of the refrigerant flow discharged from the evaporator;

wherein a ratio of a flow rate of the refrigerant flow which is separated in the fluid distributor and flows into the second turbine to an entire flow rate of the refrigerant flow discharged from the evaporator satisfies following Equation 2:

$$0.5 < F_t/F_e \leq 0.7 \qquad \text{Equation 2}$$

wherein $F_t$ is the flow rate of the refrigerant flow which is separated in the fluid distributor and flows into the second turbine and $F_e$ is the entire flow rate of the refrigerant flow discharged from the evaporator;

wherein a temperature of the refrigerant flow discharged from the evaporator and a temperature of the first fluid flow which flows into the evaporator satisfy following Equation 3:

$$1° \text{ C.} \leq T_{Ein} - T_{Eout} \leq 20° \text{ C.} \qquad \text{Equation 3}$$

wherein $T_{Ein}$ is the temperature of the first fluid flow which flows into the evaporator and is from 50° C. to 90° C., and $T_{Eout}$ is the temperature of the refrigerant flow discharged from the evaporator and is from 60° C. to 100° C.;

wherein a ratio of a pressure of the refrigerant flow which is separated in the fluid distributor and flows into the first compressor to a pressure of the refrigerant flow discharged from the first compressor satisfies following Equation 4:

$$2 \leq P_{C1out}/P_{C1in} \leq 5 \qquad \text{Equation 4}$$

wherein $P_{C1out}$ is the pressure (bar) of the refrigerant flow discharged from the first compressor and $P_{C1in}$ is the pressure (bar) of the refrigerant flow which is separated in the fluid distributor and flows into the first compressor;

wherein a ratio of a pressure of the refrigerant flow which is discharged from the second condenser and flows into the second compressor to a pressure of the refrigerant flow discharged from the second compressor satisfies following Equation 5:

$$2 \leq P_{C2out}/P_{C2in} \leq 7 \qquad \text{Equation 5}$$

wherein $P_{C2out}$ is the pressure (bar) of the refrigerant flow discharged from the second compressor and $P_{C2in}$ is the pressure (bar) of the refrigerant flow which is discharged from the second condenser and flows into the second compressor.

2. The heat recovery apparatus of claim 1, wherein the refrigerant is a refrigerant in which a slope of a tangent line of a saturated vapor curve of a temperature-entropy diagram has a positive slope.

3. The heat recovery apparatus of claim 1, wherein a temperature of the refrigerant flow which is discharged from the first condenser and flows into the first heat exchanger and a temperature of the refrigerant flow which is discharged from the first heat exchanger and flows into the fluid distributor satisfies following Equation 6:

$$1° \text{ C.} \leq T_{R1in} - T_{R1out} \leq 50° \text{ C.} \qquad \text{Equation 6}$$

wherein $T_{R1in}$ is the temperature of the refrigerant flow which is discharged from the first condenser and flows into the first heat exchanger and $T_{R1out}$ is the temperature of the refrigerant flow which is discharged from the first heat exchanger and flows into the fluid distributor.

4. A heat recovery method comprising:

a refrigerant circulation step which comprises a first circulation step of allowing a refrigerant flow to flow into an evaporator, allowing one part of the refrigerant flow discharged from the evaporator to flow into a first compressor, allowing the refrigerant flow discharged from the first compressor to flow into a first condenser, allowing the refrigerant flow discharged from the first condenser to flow into a control valve or a first turbine, and allowing the refrigerant flow discharged from the control valve or the first turbine of the first circulation step to flow into the evaporator and a second circulation step of allowing another part of the refrigerant flow discharged from the evaporator to flow into a second turbine, allowing the refrigerant flow discharged from the second turbine to flow into a second condenser, allowing the refrigerant flow discharged from the second condenser to flow into a second compressor, and allowing the refrigerant flow discharged from the second compressor to flow into the evaporator;

a first heat exchange step of heat-exchanging the refrigerant flow which flows into the evaporator with a first fluid flow which flows into the evaporator; and a second heat exchange step of heat-exchanging the refrigerant flow discharged from the first compressor with a second fluid flow which flows into the first condenser, wherein the first circulation step further comprises allowing the refrigerant flow discharged from the evaporator to flow into a first heat exchanger and then to flow into the first compressor and allowing the refrigerant flow discharged from the first condenser to flow into the first heat exchanger and then to flow into the control valve or the first turbine of the first circulation step, wherein the heat recovery method further comprises a third heat exchange step of heat-exchanging the refrigerant flow discharged from the evaporator and the refrigerant flow discharged from the first condenser in the first heat exchanger, wherein the second circulation step further comprises allowing the refrigerant flow discharged from the second turbine to flow into a second heat exchanger and then to flow into the second condenser and allowing the refrigerant flow discharged from the second compressor to flow into the second heat exchanger and then to flow into the evaporator, wherein the heat recovery method further comprises a fourth heat exchange stage of heat-exchanging the refrigerant flow discharged from the second turbine and the refrigerant flow discharged from the second compressor in the second heat exchanger, wherein a ratio of a flow rate of the refrigerant flow which flows into the first compressor to an entire flow rate of the refrigerant flow discharged from the evaporator satisfies following Equation 1:

$$0.3 \leq F_c/F_e \leq 0.5 \qquad \text{Equation 1}$$

wherein $F_c$ is the flow rate of the refrigerant flow which flows into the first compressor and $F_e$ is the entire flow rate of the refrigerant flow discharged from the evaporator;

wherein a ratio of a flow rate of the refrigerant flow which flows into the second turbine to an entire flow rate of the refrigerant flow discharged from the evaporator satisfies following Equation 2:

$$0.5 \leq F_t/F_e \leq 0.7 \qquad \text{Equation 2}$$

wherein $F_t$ is the flow rate of the refrigerant flow which flows into the second turbine and $F_e$ is the entire flow rate of the refrigerant flow discharged from the evaporator;

wherein a temperature of the refrigerant flow discharged from the evaporator and a temperature of the first fluid flow which flows into the evaporator satisfy following Equation 3:

$$1°\,C. \leq T_{Ein} - T_{Eout} \leq 20°\,C. \qquad \text{[Equation 3]}$$

wherein $T_{Ein}$ is the temperature of the first fluid flow which flows into the evaporator and is from 50° C. to 90° C., and $T_{Eout}$ is the temperature of the refrigerant flow discharged from the evaporator and is from 60° C. to 100° C.;

wherein a ratio of a pressure of the refrigerant flow which flows into the first compressor to a pressure of the refrigerant flow discharged from the first compressor satisfies following Equation 4:

$$2 \leq P_{C1out}/P_{C1in} \leq 5 \qquad \text{Equation 4}$$

wherein $P_{C1out}$ is the pressure (bar) of the refrigerant flow discharged from the first compressor and $P_{C1in}$ is the pressure (bar) of the refrigerant flow which flows into the first compressor;

wherein a ratio of a pressure of the refrigerant flow which is discharged from the second condenser and flows into the second compressor to a pressure of the refrigerant flow discharged from the second compressor satisfies following Equation 5:

$$2 \leq P_{C2out}/P_{C2in} \leq 7 \qquad \text{Equation 5}$$

wherein $P_{C2out}$ is the pressure (bar) of the refrigerant flow discharged from the second compressor and $P_{C2in}$ is the pressure (bar) of the refrigerant flow which is discharged from the second condenser and flows into the second compressor.

5. The heat recovery method of claim 4, wherein the refrigerant is a refrigerant in which a slope of a tangent line of a saturated vapor curve of a temperature-entropy diagram has a positive slope.

6. The heat recovery method of claim 4, wherein a temperature of the refrigerant flow which is discharged from the first condenser and flows into the first heat exchanger and a temperature of the refrigerant flow which is discharged from the first heat exchanger and flows into the fluid distributor satisfies following Equation 6:

$$1°\,C. \leq T_{R1in} - T_{R1out} \leq 50°\,C. \qquad \text{Equation 6}$$

wherein $T_{R1in}$ is the temperature of the refrigerant flow which is discharged from the first condenser and flows into the first heat exchanger and $T_{R1out}$ is the temperature of the refrigerant flow which is discharged from the first heat exchanger and flows into the fluid distributor.

* * * * *